(12) United States Patent
Picardi

(10) Patent No.: US 11,847,896 B2
(45) Date of Patent: *Dec. 19, 2023

(54) PREDICTIVE ALARM ANALYTICS

(71) Applicant: Alarm.com Incorporated, Tysons, VA (US)

(72) Inventor: Robert Nathan Picardi, Herndon, VA (US)

(73) Assignee: Alarm.com Incorporated, Tysons, VA (US)

( * ) Notice: Subject to any disclaimer, the term of this patent is extended or adjusted under 35 U.S.C. 154(b) by 76 days.

This patent is subject to a terminal disclaimer.

(21) Appl. No.: 17/525,410

(22) Filed: Nov. 12, 2021

(65) Prior Publication Data

US 2022/0068097 A1    Mar. 3, 2022

Related U.S. Application Data

(63) Continuation of application No. 16/881,287, filed on May 22, 2020, now Pat. No. 11,176,793, which is a continuation of application No. 16/117,843, filed on Aug. 30, 2018, now Pat. No. 10,665,070.

(60) Provisional application No. 62/552,654, filed on Aug. 31, 2017.

(51) Int. Cl.
*G08B 13/196* (2006.01)
*G08B 25/00* (2006.01)
*G06N 20/00* (2019.01)
*G06N 3/045* (2023.01)

(52) U.S. Cl.
CPC ....... *G08B 13/19615* (2013.01); *G06N 3/045* (2023.01); *G06N 20/00* (2019.01); *G08B 25/001* (2013.01); *G08B 25/008* (2013.01)

(58) Field of Classification Search
CPC ............ G08B 13/19615; G08B 25/001; G08B 25/008; G06N 20/00; G06N 3/045
USPC ......................................................... 348/152
See application file for complete search history.

(56) References Cited

U.S. PATENT DOCUMENTS

| 6,107,918 | A | 8/2000 | Klein et al. |
| 6,448,894 | B1 | 9/2002 | Desai |
| 9,165,455 | B1 | 10/2015 | Hutz |
| 9,224,285 | B1 * | 12/2015 | Trundle ............... G08B 25/001 |
| 9,953,511 | B2 | 4/2018 | Eskildsen et al. |
| 2004/0017292 | A1 | 1/2004 | Reese et al. |
| 2005/0128068 | A1 | 6/2005 | Winick et al. |

(Continued)

*Primary Examiner* — Allen C Wong
(74) *Attorney, Agent, or Firm* — Fish & Richardson P.C.

(57) ABSTRACT

Systems and techniques are provided for identifying patterns activity at a facility that seem to precede alarm events. In some implementations, a monitoring system is configured to monitor a property and includes a sensor configured to generate sensor data. A monitor control unit is configured to receive the sensor data and based on the sensor data, determine an alarm status of the monitoring system. A monitoring application server is configured to receive the sensor data and data indicating the alarm status of the monitoring system. The server applies the sensor data to a model that determines an estimated alarm status of the monitoring system and determines the estimated alarm status of the monitoring system is different from the alarm status. Based on determining that the estimated alarm status of the monitoring system is different from the alarm status of the monitoring system, the server overrides the alarm status.

20 Claims, 7 Drawing Sheets

(56) References Cited

U.S. PATENT DOCUMENTS

| | | | |
|---|---|---|---|
| 2011/0254680 A1* | 10/2011 | Perkinson | G08B 29/14 340/5.1 |
| 2016/0203700 A1 | 7/2016 | Bruhn et al. | |
| 2017/0061779 A1 | 3/2017 | Kennedy et al. | |
| 2017/0076584 A1 | 3/2017 | Eskildsen et al. | |
| 2017/0365141 A1 | 12/2017 | Byrd | |

* cited by examiner

400

```
┌─────────────────────────────────────────────────────────┐
│ OBTAINING DATA FROM ONE OR MORE SENSORS FROM ONE OR MORE│
│ MONITORING FACILITIES                                   │
│                                                     402 │
└─────────────────────────────────────────────────────────┘
                            │
                            ▼
┌─────────────────────────────────────────────────────────┐
│ ANALYZING USER BEHAVIOR INFORMATION FROM THE DATA       │
│ CORRESPONDING TO EACH OF THE ONE OR MORE MONITORING     │
│ FACILITIES                                          404 │
└─────────────────────────────────────────────────────────┘
                            │
                            ▼
┌─────────────────────────────────────────────────────────┐
│ ANALYZING ACCOUNT STATUS INFORMATION FROM THE DATA      │
│ CORRESPONDING TO EACH OF THE ONE OR MORE MONITORING     │
│ FACILITIES                                          406 │
└─────────────────────────────────────────────────────────┘
                            │
                            ▼
┌─────────────────────────────────────────────────────────┐
│ ANALYZING GEOGRAPHIC INFORMATION FROM THE DATA          │
│ CORRESPONDING TO EACH OF THE ONE OR MORE MONITORING     │
│ FACILITIES                                          408 │
└─────────────────────────────────────────────────────────┘
                            │
                            ▼
┌─────────────────────────────────────────────────────────┐
│ PROVIDING THE USER BEHAVIOR INFORMATION, THE ACCOUNT    │
│ STATUS INFORMATION, THE GEOGRAPHIC INFORMATION, AND AN  │
│ ACCOUNT IDENTIFIER TO TRAIN A NEURAL NETWORK MODEL TO   │
│ IDENTIFY WHETHER EACH OF THE ONE OR MORE MONITORING     │
│ FACILITIES IS AT RISK FOR AN ALARM                      │
│                                                     410 │
└─────────────────────────────────────────────────────────┘
```

| OBTAINING DATA FROM ONE OR MORE SENSORS OF A FIRST MONITORING PROPERTY 502 |

| PROVIDING A CURRENT USER BEHAVIOR, A CURRENT ACCOUNT STATUS, GEOGRAPHIC INFORMATION, AND AN ACCOUNT IDENTIFICATION INFORMATION CORRESPONDING TO THE DATA FROM THE FIRST MONITORING PROPERTY TO A TRAINED NEURAL NETWORK MODEL TO PRODUCE AN INDICATION SCORE OF WHETHER THE FIRST MONITORING PROPERTY IS AT RISK FOR AN ALARM 504 |

| COMPARING THE INDICATION SCORE TO A PREDETERMINED THRESHOLD TO DETERMINE WHETHER TO ALERT A USER CORRESPONDING TO THE FIRST MONITORING PROPERTY AND A DEALER THAT INSTALLED AN ALARM SYSTEM AT THE FIRST MONITORING PROPERTY THAT THE FIRST MONITORING PROPERTY IS AT RISK FOR AN ALARM 506 |

| DETERMINING A CATEGORY OF THE ALARM AS EITHER A FALSE ALARM OR A VERIFIED ALARM FOR THE FIRST MONITORING PROPERTY BASED ON A DATA INTEGRATION WITH A CENTRAL STATION THAT CORRESPONDS TO THE FIRST MONITORING PROPERTY 508 |

| BASED ON A DETERMINATION OF WHETHER THE CATEGORY OF THE ALARM FOR THE FIRST MONITORING PROPERTY IS A FALSE ALARM OR A VERIFIED ALARM, PROVIDING THE FALSE ALARM TO A TRAINING MODEL OF THE NEURAL NETWORK MODEL OR PROVIDING THE VERIFIED ALARM TO THE USER CORRESPONDING TO THE FIRST MONITORING PROPERTY 510 |

FIG. 5

PREDICTIVE ALARM ANALYTICS

CROSS-REFERENCE TO RELATED APPLICATIONS

This application is a continuation of U.S. application Ser. No. 16/881,287, filed May 22, 2020, now allowed, which is a continuation of U.S. application Ser. No. 16/117,843, filed Aug. 30, 2018, now U.S. Pat. No. 10,665,070, issued May 26, 2020, which claims the benefit of U.S. Provisional Application No. 62/552,654 filed Aug. 31, 2017, and titled "Predictive Alarm Analytics." The complete disclosures of all of the above patent applications are hereby incorporated by reference in their entirety for all purposes.

TECHNICAL FIELD

This specification relates generally to techniques for predictive alarm analytics.

BACKGROUND

Alarm systems are designed to provide an alert to users after an incident has occurred. In particular, alarm systems are used in residential, commercial, industrial, and military purposes for protection against burglary from intruders and detecting property damage from fire, water, and smoking hazards.

SUMMARY

The subject matter of the present disclosure is related to techniques for identifying patterns in activity or account status at a residential facility that seem to precede alarm events. The techniques may use machine learning, such as one or more neural network models, one or more clustering models, one or more deep learning models, Bayesian learning models, or any other type of machine learning technique, to detect the patterns that may predict the likelihood of an alarm event. In response to detecting the likelihood of the alarm event, the techniques may transmit a notification to homeowners of the residential facility and dealers that installed the security systems at the residential facility indicating the residential facility has a high propensity for an alarm event. The benefit of providing the likelihood of the alarm event to the residential facility is such that homeowners can take one or more steps to help decrease the likelihood of the alarm event. Additionally, by notifying the dealers of the alarm events, the dealers may take one or more steps to help decrease the likelihood of the alarm event. The one or more steps may include modifying behavior of the homeowner with regards to securing the residential facility, adding more security components to the security system in the residential facility, and/or fixing any of the security components in the security system that may be broken.

In some implementations, the techniques can divide the likelihood of the alarm event into false alarms and verified alarms. The techniques can identify patterns that correlate to a verified alarm event and a false alarm event to improve the efficiency of the security system. By providing the necessary feedback to the residential facility, the techniques can identify a specific type of alarm the residential facility may likely experience. For example, the specific types of alarm may include a smoke alarm, a breaking and entering alarm, or a CO alarm, to name a few examples.

In some implementations, the techniques may be able to provide feedback to dealers based on their performance of installing and maintaining an error free security system in the residential facility. The techniques can ensure dealers are held accountable if the installed security system includes a high false alarm rate or a high missed alarm rate. The techniques can provide a list of ranked dealers to one or more clients to allow the client to choose a dealer to install a security system in the client's residential facility.

In one general aspect, a method is performed by one or more computers of a monitoring system. The method includes receiving, from a sensor that is located at the property and that is configured to generate sensor data, the sensor data; based on the sensor data, determine, by the monitor control unit, an alarm status of the monitoring system; and a monitoring application server that is configured to: receive the sensor data and data indicating the alarm status of the monitoring system; apply the sensor data to a model that determines an estimated alarm status of the monitoring system; determine that the estimated alarm status of the monitoring system is different from the alarm status of the monitoring system; based on determining that the estimated alarm status of the monitoring system is different from the alarm status of the monitoring system, overriding the alarm status of the monitoring system.

Other embodiments of this and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

Implementations may include one or more of the following features. For example, in some implementations, the monitoring application server is configured to: receive the sensor data and the data indicating the alarm status of the monitoring system by receiving the sensor data and the data indicating an inactive alarm; based on applying the sensor data to the model that determines the estimated alarm status of the monitoring system, determine a risk score of the monitoring system, the risk score indicating a likelihood that the monitoring system is at risk for an alarm; compare the risk score to an active alarm threshold; based on comparing the risk score to the active alarm threshold, determine that the alarm score satisfies the active alarm threshold; based on determining that the risk score satisfies the active alarm threshold, determine that the estimated alarm status of the monitoring system is an estimated active alarm; determine that the estimated alarm status of the monitoring system is different from the alarm status of the monitoring system by determining that the inactive alarm is different than the estimated active alarm; and override the alarm status of the monitoring system by setting the alarm status of the monitoring system to an active alarm.

In some implementations, the method further includes the monitoring application server is configured to: based on applying the sensor data to the model, identify one or more actions a resident of the property can take to reduce the risk score; and provide, for output, data identifying the one or more actions.

In some implementations, the method further includes the monitoring application server is configured to: based on applying the sensor data to the model, identify one or more actions an installer of the monitoring system can take to reduce the risk score; and provide, for output, data identifying the one or more actions.

In some implementations, the method further includes the monitoring application server is configured to: receive the sensor data and the data indicating the alarm status of the monitoring system by receiving the sensor data and the data indicating an active alarm; based on applying the sensor data to the model that determines the estimated alarm status of the monitoring system, determine a risk score of the monitoring system, the risk score indicating a likelihood that the monitoring system is at risk for an alarm; compare the alarm score to an inactive alarm threshold; based on comparing the risk score to the inactive alarm threshold, determine that the alarm score satisfies the inactive alarm threshold; based on determining that the risk score satisfies the inactive alarm threshold, determine that the estimated alarm status of the monitoring system is an estimated inactive alarm; determine that the estimated alarm status of the monitoring system is different from the alarm status of the monitoring system by determining that the active alarm is different than the estimated inactive alarm; and override the alarm status of the monitoring system by setting the alarm status of the monitoring system to an inactive alarm.

In some implementations, the method further includes the monitoring application server is configured to: receive, from a user, data verifying the overridden alarm status of the monitoring system; based on receiving, from the user, data verifying the overridden alarm status of the monitoring system, updating the model that determines the estimated alarm status of the monitoring system.

In some implementations, the method further includes the monitoring application server is configured to: receive additional sensor data and data indicating an additional alarm status of the monitoring system; apply the additional sensor data to the model that determines an estimated alarm status of the monitoring system; determine that the additional estimated alarm status of the monitoring system is the same as the additional alarm status of the monitoring system; and based on determining that the additional estimated alarm status of the monitoring system is the same as the alarm status of the monitoring system, maintaining the additional alarm status of the monitoring system.

In some implementations, the method further includes the monitoring application server is configured to: receive verified active alarm data, false active alarm data, verified inactive alarm data, and false inactive alarm data; and train, using machine learning, the model that determines the estimated alarm status of the monitoring system using the verified active alarm data, the false active alarm data, the verified inactive alarm data, and the false inactive alarm data.

In some implementations, the method further includes the monitoring application server is configured to: receive geographic data, past user behavior data, account status data, account identification data, current account status data, and current user behavior data; and apply the sensor data to the model that determines the estimated alarm status of the monitoring system by applying the sensor data, the geographic data, the past user behavior data, the account status data, the account identification data, the current account status data, and the current user behavior data to the model that determines the estimated alarm status of the monitoring system.

In some implementations, the method further includes the monitor control unit is included in the monitoring application server.

BRIEF DESCRIPTION OF THE DRAWINGS

FIG. 4 is a flowchart of an example process for training a neural network model for predictive alarm analytics.

FIG. 5 is a flowchart of an example system for providing a score representing a likelihood of an alarm to a monitored facility.

DETAILED DESCRIPTION

Figure 1:
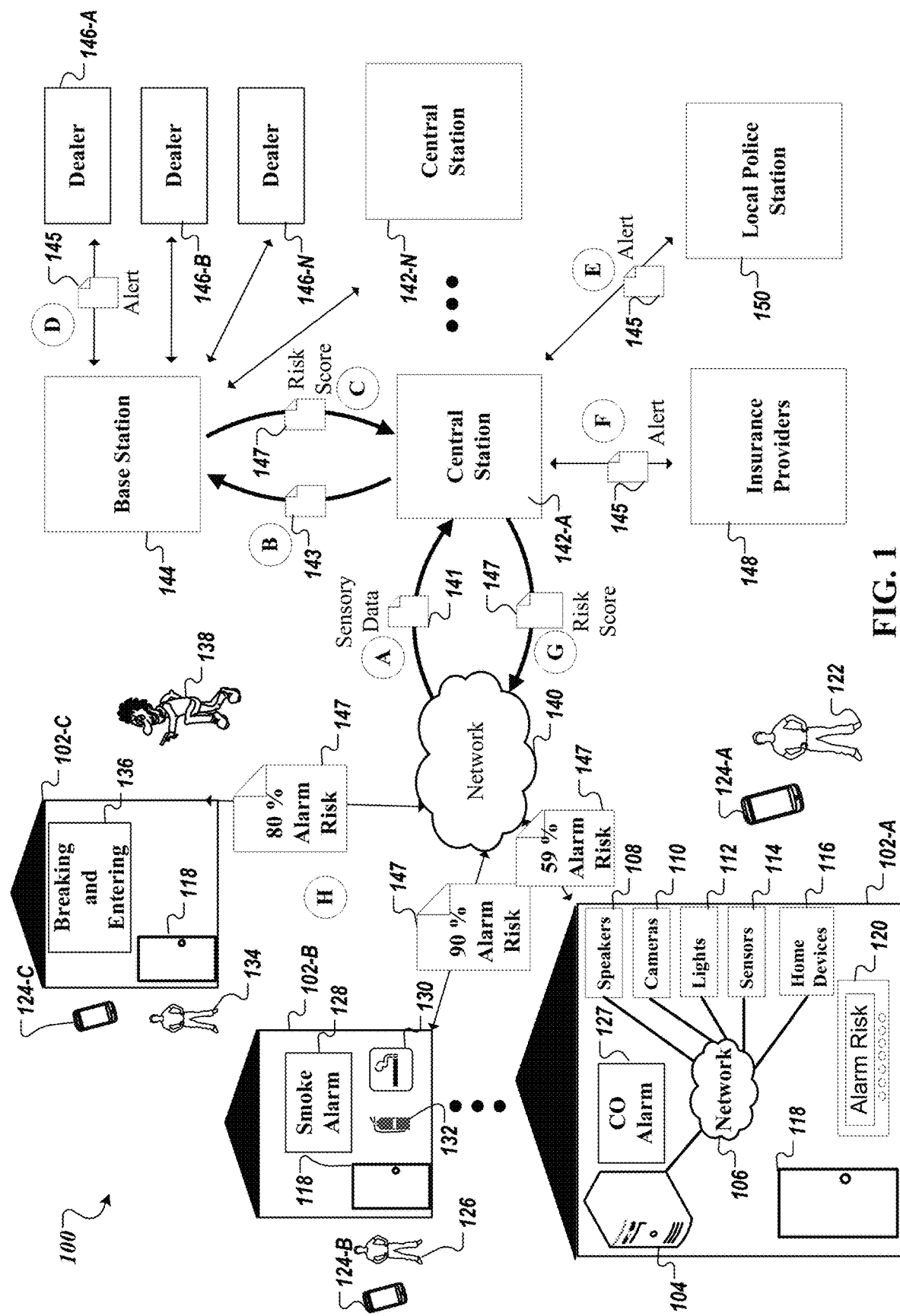
FIG. 1 is a contextual diagram of an example system of an integrated security environment for predicting a risk of an alarm event for a monitoring facility.

FIG. 1 is a contextual diagram of an example system 100 of an integrated security environment for predicting a risk of an alarm event for a monitoring facility. Though system 100 is shown and described including a particular set of components in a monitored property 102-A includes a control unit server 104, network 106, speakers 108, cameras 110, lights 112, sensors 114, home devices 116, security panel 120, network 140, central station 142-A through 142-N, base station 144, dealer 146-A through 146-N, insurance providers 148, and local police station 150, the present disclosure need not be so limited. For instance, in some implementations only a subset of the aforementioned components may be used by the integrated security environment for monitoring the control unit servers in each monitored property. As an example, there may be an example a system 100 that does not use the speakers 108. Similarly, there may be implementations that the control unit, such as control unit server 104, is stored in the central station 142-A. Yet other alternative systems also fall within the scope of the present disclosure such as a system 100 that does not use a control unit server 104. Rather, these systems would communicate directly with the central station 142-A to perform the monitoring. For these reasons, the system 100 should not be viewed as limiting the present disclosure to any particular set of necessary components.

As shown in FIG. 1, a residential facility 102-A (e.g., home) of user 122 is monitored by a control unit server 104 that includes components within the residential facility 102-A. The components within the residential facility 102-A may include one or more speakers 108, one or more cameras 110, one or more lights 112, one or more sensors 114, one or more home devices 116, and the security panel 120. The one or more cameras 110 may include video cameras that are located at the exterior of the residential facility 102-A near the front door 118 and a garage door, as well as located at the interior of the residential facility 102-A near the front door 118. The one or more sensors 114 may include a motion sensor located at the exterior of the residential facility 102-A, a front door sensor that is a contact sensor positioned at the front door 118, a garage door sensor that is a contact sensor positioned at the garage door, and a lock sensor that is positioned at the front door 118 and each window. The contact sensor may sense whether the front door 118, the garage door, or the window is in an open position or a closed position. The lock sensor may sense whether the front door 118 and each window is in an unlocked position or a locked position. The one or more home devices 117 may include home appliances such as a washing machine, a dryer, a dishwasher, an oven, a stove, a microwave, and a laptop, to name a few examples. The security panel 120 may receive one or more messages from a corresponding central station 142-A and a base station 144.

The control unit server 104 communicates over a short-range wired or wireless connection over network 106 with connected devices such as each of the one or more speakers 108, one or more cameras 110, one or more lights 112, one or more home devices 117 (washing machine, a dryer, a dishwasher, an oven, a stove, a microwave, a laptop, etc.), one or more sensors 114, and the security panel 120 to receive sensor data descriptive of events detected by the one or more speakers 108, the one or more cameras 110, the one or more lights 112, and the one or more home devices 116 in the residential facility 102-A. In some implementations, each of the connected devices may connect via Wi-Fi, Bluetooth, or any other protocol used to communicate over network 106 to the control unit server 104. Additionally, the control unit server 104 communicates over a long-range wired or wireless connection with a central station over network 140 via one or more communication links.

In some implementations, the central station 142-A is located remote from the residential facility 102-A, and manages the monitoring at the residential facility 102-A, as well as other (and, perhaps, many more) monitoring systems located at different properties that are owned by different users. For example, the central station 142-A may manage the monitoring of residential facilities 102-A, 102-B, and 102-C. In some implementations, the central stations 142 may monitor one or more residential facilities 102 based on a geographic region. For example, central station 142-A may be assigned to monitor each residential facility 102-A through 102-N located in the state of Virginia. Central station 142-B may be assigned to monitor each residential facility 102-A through 102-N located in the state of Maryland. Alternatively, the geographic regions may correspond to a city, a county, a neighborhood, or any other region that groups together one or more monitored facilities 102.

In other implementations, the central station 142-A is located locally at each monitored residential facility 102-A through 102-N. The central station 142-A may communicate bi-directionally with the control unit server 104 at each monitored residential facility 102-A. Specifically, the central station 142-A receives sensor data descriptive of events detected by the sensors included in the monitoring system of each residential facility 102-A through 102-N based on a corresponding geographic region. Additionally, the central station 142-A transmits instructions to the control unit server 104 for particular events.

In some implementations, the system 100 includes a base station 144 that manages the monitoring of each central station 142-A through 142-N. The base station 144 may include one or more databases and an application infrastructure to manage identifying patterns in activity at one or more residential facilities that seem to precede alarm events. In particular, the one or more databases and the application infrastructure may be arranged in a cloud computing infrastructure. The base station 144 may communicate bi-directionally with each central station 142-A through 142-N. In addition, the base station 144 may act as the message handler when one central station 142 plans to notify another central station of an alarm. For example, a user 122 at residential facility 102-A corresponding to central station 142-A may have relatives living at a residential facility 102-B corresponding to central station 142-C. If the control unit 104 determines a break and entering occurred at user 122's residence, then the central station 142-A may transmit a notification to the base station 144- to notify user 122's relatives at the residential facility 102-B. The base station 144 may transmit the notification to the central station 142-C to propagate the message to the residential facility 102-B to inform user 122's relatives.

In some implementations, the base station 144 may communicate with dealers 146-A through 146-N. The dealers 146-A through 146-N may include one or more customers with the base station 144 that install alarm systems in the residential properties 102-A through 102-N. For example, a dealer, such as dealer 146-N, may install security components such as the control unit server 104, the speakers 108, the cameras 110, and the sensors 114 in the residential facility 102. The dealer 146-N may install the communications between each of the speakers 108, the cameras 110, the sensors 114 and the control unit server 104-N. The dealer 146-N may verify successful communications between each of the devices and may be notified by the corresponding central station 142-A should any of the devices and/or communications fail. Additionally, the dealer 146-N may ensure successful communications between the control unit server 104 and the central station 142-A over network 140. Each dealer 146-N may set up the devices and communications for one or more residential facilities 102.

In some implementations, the base station 144 may communicate with one or more insurance providers 148. The one or more insurance provider 148 may include one or more insurance companies that provide insurance such as home owners insurance, vehicle insurance, rental insurance, medical insurance, and pet insurance, to name a few examples. The base station 144 may provide information to the insurance provider 148 corresponding to the residential facility 102-A that indicate a potential alarm event, an actual alarm event, an insurance claim to file from a user, such as user 122, owning a residential facility 102-A, and one or more payments from a device, such as client device 124-A, of user 122 to pay for various types of insurance.

In some implementations, the base station 144 may communicate with a police station 150 local to a central station 142 based on a geographic region. For example, the base station 144 may communicate with a police station 150 local to a central station 142-A, when the base station 144 determines an alarm event, such as a breaking and entering event, occurs at a residential facility 102-A monitored by the central station 142-A. The base station 144 may communicate with another police station 150 local to a central station 142-B, when the base station 144 determines an alarm event, such as a smoke alarm, occurs at a residential facility 102-B monitored by the central station 142-B. The base station 144 may provide a notification that includes an address of the residential facility 102-A where the alarm event occurred, a name of the user, such as user 122, corresponding to the residential facility 102-A, and contact information for the user 122.

In the example shown in FIG. 1, user 122 may prepare to leave the residential facility 102-A and arm the residential facility 102-A upon departure. In doing so, the user 122 may turn off each of the one or more lights 112, turn off each of the one or more home devices 117, lock the front door 118, and close and lock each of the one or more windows. In some implementations, the user 122 may interact with a client device 124-A to activate a signature profile, such as "arming home" for the residential facility 102-A. The client device 124-A may display a web interface, an application, or a device specific application for a smart home system. The client device 124-A can be, for example, a desktop computer, a laptop computer, a tablet computer, a wearable computer, a cellular phone, a smart phone, a music player, an e-book reader, a navigation system, a security panel, or any other appropriate computing device. In some implementations, the client device 124-A may communicate with the control unit server 104 over the network 106. The network 106 may be wired or wireless or a combination of both and can include the Internet.

In some implementations, user 122 may communicate with the client device 124-A to activate a signature profile for the residential facility 102-A. To illustrate, user 122 may first instruct the control unit server 104 to set a signature profile associated with arming the residential facility 102-A. For example, user 122 may use a voice command to say "Smart Home, arm house," to the client device 124-A. The voice command may include a phrase, such as "Smart Home" to trigger the client device 124-A to actively listen to a command following the phrase. Additionally, the phrase "Smart Home" may be a predefined user configured term to communicate with the client device 124-A. The client device 124-A can send the voice command to the control unit server 104*a* over the network 106.

In some implementations, the control unit server 104 may notify the central station 142-A that the residential facility 102-A is to be armed. Each residential facility 102-A through 102-C corresponding to an associated central station 142 may perform the actions mentioned above. In addition, the control unit 104 may set associated parameters in response to receiving the voice command. Moreover, the control unit 104 can send back a confirmation to the client device 124-A in response to arming the residential facility 102-A and setting the associated parameters. For example, the control unit server 104 may transmit a response to the client device 124-A that reads "Smart Home armed."

In some implementations, in order for the control unit server 104 to allow user 122 and others to activate a signature profile case for the residential facility 102-A, the user 122 and others may define and store signature profiles in the control unit server 104. In other implementations, the user 122 and others may define and store signature profiles in the central station 142-A. The signature profile may be associated with each user and allow for various use cases of the devices in the residential facility 102-A. Each of the signature profiles can be associated with one user, such as user 122. For example, user 122 may create a signature profile for arming the residential facility 102-A.

In some implementations, user 122 may store one or more parameters associated with a use case in his or her signature profile. Specifically, the one or more parameters for each use case may describe a specific song to be played when activating a use case, a volume level in decibels (dB) of the speakers 108, an aperture amount for the cameras 110, a brightness intensity level of the lights 112, turning on home devices 117 such as television, laptop, one or more fans, setting a specific temperature of a thermometer, opening or closing the shades of a window a particular amount, alarm settings corresponding to the security panel 120, and any other parameters to describe the use case. For example, user 122 may create a signature profile with a use case for "arm home". The user 122 may define the one or more parameters to play no song, a volume level of 0 dB for the speakers 108, an aperture of f/16 for the one or more cameras 110, zero lumens for the one or more lights 112, turning off a television, turning off a laptop, turning on fans, setting the thermometer to 77 degrees Fahrenheit, fully closing the blinds of the one or more windows, and setting the security panel 120 to notify the central station 142-A for any detected alarms. In some implementations, the control unit server 104 sets the parameters for the signature profile when the user 122 speaks "arming the home" to client device 124-A.

In some implementations, the control unit server 104 may increase the sensitivity corresponding to each of the one or more sensors 114 for the "arming the home" use case. Specifically, control unit server 104 may increase the sensitivity for the front door sensor, the garage door sensor, and the lock sensor by a predetermined factor so that smaller movements of the front door or garage door trigger an alarm event. For example, the sensitivity may be increased by a factor of five.

In some implementations, the control unit server 104 may send a response to display a message on the client device 122*a* that says "Smart Home, home armed" once the control unit server 104 sets the parameters. The control unit server 104 may also transmit the same response to the security panel 120 for display once the control unit server 104 sets the parameters. In addition, the control unit server 104 may transmit a message to the central station 142-A that the residential facility 102-A finished arming.

In some implementations, the base station 144 may seek to predict how at risk a residential facility 102 is to experience an alarm. The base station 144 may obtain data from each of the sensors located at each residential facility 102 through a respective central station 142. The base station 144 may use the obtained data to predict a likelihood that a residential facility 102 is to experiencing an alarm by outputting a score to provide to a user, or homeowner, of the residential facility 102. By providing a score that indicts a likelihood that an alarm may occur at the residential facility 102, the base station 144 may improve the effectiveness of security systems, maintain safer residential facilities, drive costs down for users with homeowner's insurance due to lower risk, detect false alarms, detect missed alarm events, and hold dealers accountable for inefficient installed security systems.

For example, during stage (A), the base station 144 may send a request to the central station 142 for sensor data 141 corresponding to each of its monitored residential facilities 102-A through 102-N. In some implementations, the central server 142-A may communicate with a control unit server 104 located in each residential facility 102 to retrieve the sensor data. The sensor data 141 may include data from the speakers 108, the cameras 110, the lights 112, the sensors 114, the home devices 116, and the security panel 120. The base station 144 may require the central server 142-A to retrieve sensor data 141 over a period of time. For example, the base station 144 may require sensor data 141 from each of the residential facilities 102 over the past one year. In addition, the base station 144 may require the central server 142-A to retrieve sensor data 141 at a present moment in time. For example, the base station 144 may require sensor data 141 from each of the residential facilities 102 at the present time. More details on the obtained sensor data 141 will be further provided below.

During stage (B), the central station 142-A combines the obtained sensor data 141 from each of its monitored residential facilities 102 to provide to the base station 144. The combined sensor data 143 includes an account identifier corresponding to each of the residential facilities 102-A through 102-C. For example, an account identifier may be an address of a residential facility 102-A such as 1234 Cedar Lane, Las Vegas, NV In another example, the account identifier may be a name corresponding to the residential facility 102-A, such as "John's House." The account identifier provides the central station 142-A with an efficient method to track its monitored facilities. Additionally, the combined sensor data 143 includes the sensor data 141 corresponding to each of the residential facilities 102. The central station 142-A may append the account identifier to the corresponding sensor data 141 and include that information in the combined sensor data 143.

In some implementations, the base station 144 may use the account identifier as a way to track incoming data from each central station 142. The base station 144 may include a storage facility that stores data corresponding to each central station and subsequently, each of its monitored residential facilities 102. By using this method of storing, the base station 144 can efficiently store and retrieve sensor data 141 under the account identifier for each central station 142.

During stage (C), the base station 144 provides a risk score 147 corresponding to each residential facility 102. As will be explained in further detail below, the base station 144 trains a neural network model to recognize patterns that may lead to alarms corresponding to each residential facility 102. In particular, the base station 144 can use a large amount of obtained sensor data 141 in the combined sensor 143 to train the neural network model identify patterns that precede an alarm event to determine whether someone will or is likely to experience an alarm event. For example, since the central stations 142-A are based on geographic regions, the base station 144 may receive training data from over one million residential facilities 102, which allows for training a neural network model that can provide a strong indication of identifying patterns that precede an alarm event. In order for the neural network model to provide the indication of a potential alarm event, the neural network model may first be trained to identify these patterns. The training of the neural network model will be further described below. Once the neural network model is sufficiently trained, the neural network model can generate the indication of a potential alarm event in the form of a risk score, such as risk score 147. The base station 144 can send the risk score 147 to a homeowner of the residential facility 102, such as user 122, to indicate a likelihood that an alarm event may occur or will occur. In addition, the base station 144 may provide an indication to the homeowner 122 on how to reduce the risk score 147 such that the likelihood that the alarm event may or will occur is substantially reduced. In some implementations, the higher the risk score 147, the more likely that an alarm event may or will occur. Conversely, the lower the risk score 147, the less likely that an alarm event may or will occur.

During stage (D), the base station 144 may provide an alert 145 to a dealer 146-A that installed a security system in the residential facility 102 corresponding to the calculated risk score. In some implementations, the alert 145 may include the risk score 147 and a description of a potential alarm event corresponding to the residential facility 102. For example, the base station 144 may provide a risk score of 59% corresponding to a likelihood of a predicted alarm event, such as for a CO alarm event 127, for residential facility 102-A. In addition, the base station 144 may provide the description of the predicted alarm event—"CO alarm event" to the dealer 146-A. By providing the calculated risk score and the description of the predicted alarm event, the dealer 146-A may have a strong chance to determine why the residential facility 102-A is at risk for such an alarm event.

Afterwards, the dealer 146-A may contact the homeowner of the residential facility 102-A, the user 122, and take an action to isolate and correct the issue of the possible CO alarm event.

During stage (E), the base station 144 may communicate with a police station 150 local to a central station 142 corresponding to a predicted alarm event for a residential property 102. For example, the base station 144 may determine a risk score 147 of 80% for a predicted alarm event, such as for a breaking and entering alarm event 136, for residential facility 102-C. The base station 144 may communicate an alert 145 to the police station 150 local to the central station 142-A corresponding to the residential facility 102-C. As mentioned above, the alert 145 may include the risk score 147 and the description of the potential alarm event corresponding to the residential facility 102-C. For example, in this case, the alert 145 may include a risk score 147 of 80% and the description of the predicted alarm event—"Breaking and Entering" 136 to the police station local to the central station 142-A.

In some implementations, the user 134 corresponding to the residential facility 102-C may receive an alert from the central station 142-A on the client device 124-C. The alert may include the risk score 147, the description of the alert, and a warning message to display indicating to be watchful of individuals seeking to break into the residential facility 102-C. For example, the alert may include the risk score 147 of 80%, a description indicating "breaking and entering" 136, and a warning message indicating "Please watch out for one or more individuals to break into your home," individuals such as a robber 138. At this point, the user 134 can take action to ensure the residential facility 102-C is properly armed by indicating to the client device 124-C to arm the home. Additionally, the user 134 may call the local police station 150 should the user 134 notice one or more suspect individuals seeking to enter the residential facility 102-C without welcome, such as the robber 138.

During stage (F), the base station 144 may communicate with one or more insurance providers 148 that provide insurance to a homeowner for a residential property 102-A. For instance, the base station 144 may communicate the alert 145 to the one or more insurance providers 148 that provide insurance to a user, such as user 126, for residential facility 128. As mentioned above, the alert 145 may include a risk score 147 and a description of the potential alarm event corresponding to a residential facility, such as residential facility 102-B. For example, the alert 145 may include a risk score 147 of 90% and a description indicating "Smoke alarm" 128 corresponding to the residential facility 102-B. The insurance provider 148 may be able to start the initiate the process of filling out a claim for user 124-B for the smoke alarm 128 event. In some implementations, the base station 144 may transmit an indication to the client device 124-B of user 126 to reduce any likelihood of a smoke alarm event 128. For example, the base 144 may transmit an indication to the client device 124-B to put out any cigarettes 130 and locate any additional fire extinguishers 132 in preparation or in response to a smoke alarm event.

In some implementations, the base station 144 may provide information to the insurance providers 148 for each of the one or more residential facilities 102. The information may include one or more past risk scores 147, account identifiers, and descriptions indicating the users corresponding to the account identifiers are less likely at risk for an alarm event. By providing this information to insurance companies to potentially help reduce overall insurance costs for users, this may incentivize users to take one or more additional actions to try to reduce a corresponding risk score for the user's residential facility 102. For example, the user 122 will lock the front door 118 when departing the residential facility 102-A. In addition, the user 122 may buy one or more additional security devices, such as a CO detector, a PIR sensor, or one or more additional motion sensors. The user 122 may connect the one or more additional security devices to communicate with the control unit server 104 in order for the data to be obtained by the central station 142-A and subsequently the base station 144. As a result, additional security devices may reduce the user's alarm risk score 147 for a residential facility 102. Additionally, the more correctly working security devices utilized in a residential facility 102, the stronger indication that the risk score 147 is more accurate of a predicated alarm event.

During stage (G), the base station 144 may provide each risk score 143 to a corresponding central station 142. For example, the base station 144 may provide a risk score 143 for each residential facility 102-A, residential facility 102-B, and residential facility 102-C corresponding to central station 142-A. Likewise, the base station 144 may provide a risk score 143 for each residential facility 102-D, residential facility 102-E, and residential facility 102-F corresponding to central station 142-B.

During stage (H), each central station 142 may provide the risk scores 147 to each of its corresponding monitored residential facilities 102. For example, central station 142-A may provide a 59% alarm risk score 147 to client device 124-A, a 90% alarm risk score 147 to client device 124-B, and an 80% alarm risk score 147 to client device 124-C. Each alarm risk score 147 may be displayed on each client device for each respective user to view. In some implementations, each central station 142 may transmit each alarm risk score to the alarm risk panel 120 located within each residential facility 102. Additionally, the central station 142 may provide a description of the predicted alarm event corresponding to each respective residential facility 102 for display. In response to receiving the alarm risk score 147 and a description of the predicted alarm event for each monitored residential facilities 102, a user, such as user 122 or user 126, may take one or more additional steps to reduce the corresponding alarm risk score 147. For example, user 122 may contact the dealer 146-B that installed the control unit server 104 and sensors 108 to inspect any issues with the residential property 102-A.

Figure 2:
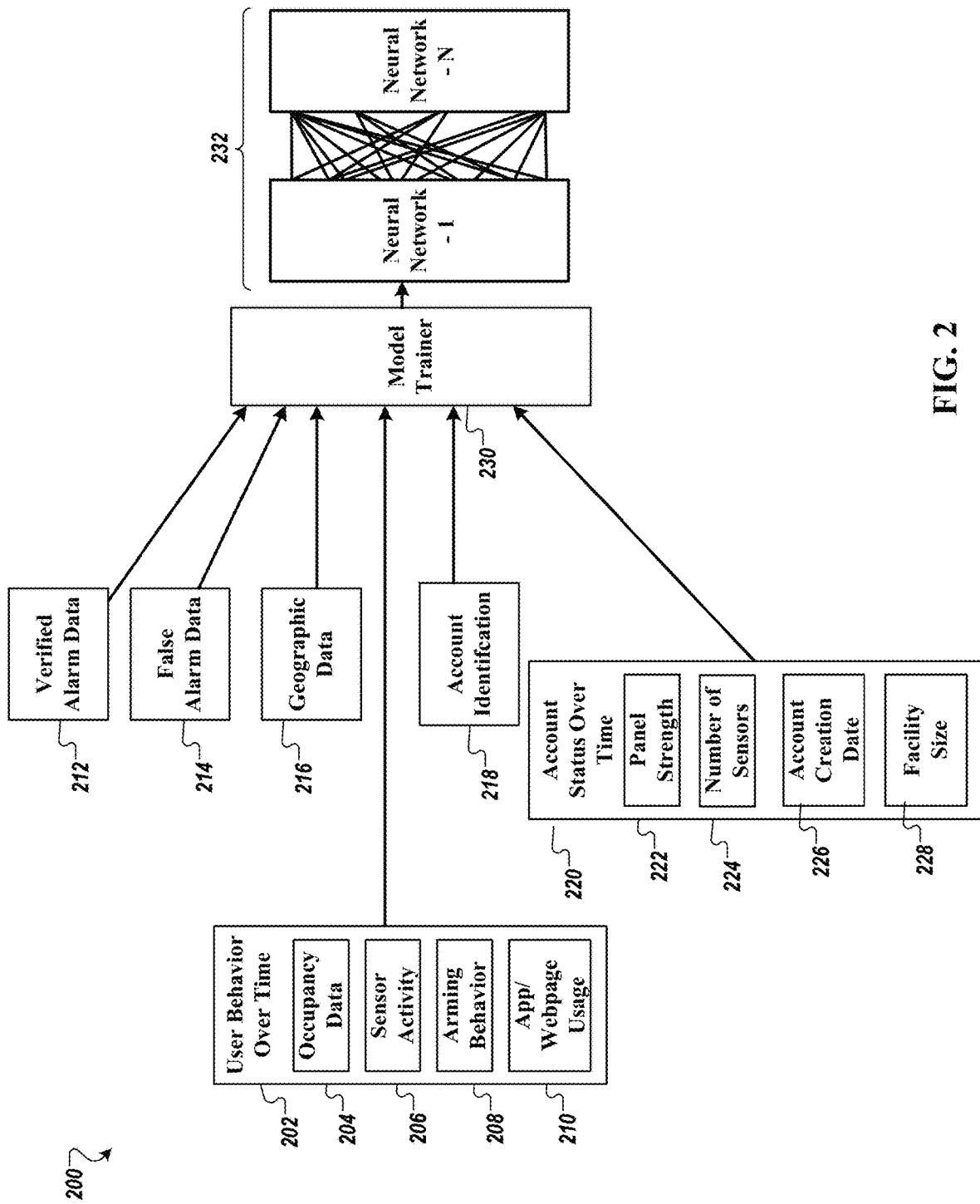
FIG. 2 is contextual diagram of an example system for training a neural network model for predictive alarm analytics.

FIG. 2 is contextual diagram of an example system 200 of training a neural network model for predictive alarm analytics. The system 200 can train other types of machine learning modes for predictive alarm analytics, such as one or more clustering models, one or more deep learning models, Bayesian learning models, or any other type of model. Briefly, and as described in more detail below, the system 200 illustrates the training phase for a model in the base station 144. In some implementations, the data provided as input to the model is the obtained sensor data from each of the residential facilities 102 provided by the central stations 142. In some implementations, the base station 144 of FIG. 1 may train and apply the model.

In some implementations, the model trainer 230 receives the sensor data from different central stations 142 that obtained sensor data from each of its monitored residential facilities 102. The sensor data includes data provided by each control unit server 104A to each of the respective central stations 142. Each control unit server 104a obtains sensor data from the cameras 110, the sensors 114, the home devices 116, and the security panel 120. For example, the sensor data from the cameras 110 may include recorded video and images from around each residential facility 102. The sensor data provided by the sensors 114 may include data from motion sensors, lock sensors, PIR sensors, curtain sensors, contact sensors, and force sensors, to name a few examples. The sensor data provided by the home devices 116 may include a usage amount of each of the home devices 116 over a period of time. The usage amount may include how often a user, such as user 122, interacted with each of the home devices 116. In addition, the sensor data may include how often the user, such as user 122, interacts with the application on the corresponding client device 124-A.

As shown in FIG. 2, the base station 144 receives obtained sensor data to provide to the model trainer 230. The base station 144 analyzes the obtained sensor data to determine user behavior over time information 202 and account status over time information 220. For instance, the base station 144 produces user behavior over time information 202, account status information 220, geographic data, and account identification information 218 from the obtained sensor data. The occupancy data 204 indicates how many users occupy the residential facility 102 during different times of the day. The sensor activity 206 indicates data provided by the one or more sensors 114 for the residential facility 102. For example, the data may include detected events, such as motion detection or locked contact detection, or non-detected events, such as data indicating non-motion or unlocked detection data, during various times of the day. The past user behavior over time information 202 may include how often the user interacts with various devices in the monitored property, such as the doors, windows, appliances, client devices, and leaves/returns to the monitored properties. This can be in the form of a count to a particular time of the day, as well as what specific activities the user partakes in at the residential facility 102. The arming behavior 208 includes a number of times a user 122 armed the residential property 102 by enabling the arm home signature profile over a period of time. The app/webpage usage 210 may include a number of times user 122 interacts with the web interface or the application on a respective client device 124-A over a period of time. In some implementations, the period of time may be over a period of 24 hours. In other implementations, the period of time may be over an entire year.

In some implementations, the account status over time information 220 includes panel strength 222, number of sensors 224, account creation date 226, and facility size 228. The panel strength 222 includes an indication of a signal strength of the security panel 120. For instance, the signal strength of the security panel 120 may be represented by a received signal strength indicator (RSSI) as indicated by the control unit server 104. For example, the RSSI can be values ranging from −40 decibel-milliwatts (dBm) to −100 dBm. The number of sensors 224 may include a number of one or more sensors 114 in the residential facility 102. For example, an unusual number of sensors 224 may exist such as a low number of sensors or a high number of sensors. The account creation date 226 may include a date at which a dealer 146-A set up the security system including the control unit server 104 and the one or more sensors 114 at the residential facility 102.

In some implementations, the account identification information 218 identifies a residential facility 102. For example, the identified account identification information 218 may be an address of a residential facility 102-A such as 1234 Cedar Lane, Las Vegas, NV In another example, the account identifier may be name corresponding to the residential facility 102-A, such as "John's House." The account identifier provides the central station 142-A with an efficient method to track each of its monitored facilities 102.

In some implementations, the geographic data 216 identifies a region corresponding to a location of the residential facility 102. For example, the residential facility 102 may be located in the state of Virginia, which is the identified region. In some implementations, certain geographic regions have a higher likelihood of alarm events than others. Additionally, geographic regions that include past alarm events will have a higher likelihood of future alarm events of a similar kind.

In some implementations, the base station 144 includes storage for verified alarm data 212 and false alarm data 214. The verified alarm data 212 includes one or more previous alarms that have been verified by the base station 144 and a description of the type of the verified alarm. For example, the model 232 may produce an alarm score and the base station 144 may determine from the alarm score and one or more additional factors whether the alarm score was correct in indicating an alarm. The one or more additional factors may include data from the central stations 142 that indicate whether the police forces from the local police station 150 were dispatched to the residential facility 102, and data indicating from the insurance providers 148 such that a claim, relating to the alarm score, was filed to cover damage to the residential property 102. The description of the type of the verified alarm may be pulled from information in a police report filed with the local police station 150 and any additional description data provided in a claim filed with the insurance providers 148. Additionally, the false alarm data 214 includes one or more previous alarms that have been verified to be fake by the base station 144. False alarms may occur due to failed sensors 114, failed cameras 110, a failed security panel 120, and/or a failed control unit server 104.

For each residential facility 102, the model trainer 230 receives user behavior over time information 202, account status over time information 220, account identification information 218, geographic data information 216 pertaining to the residential facility 102, false alarm data 214 for that residential facility 102, and verified alarm data 212 for that residential facility 102. The model trainer 230 uses each of the obtained input to train a neural network model 322 or any other type of machine learning model. The neural network model 232 may include an input layer, an output layer, and one or more hidden layers. The model trainer 230 may use a machine learning technique to continuously train the model 232 as the base station 133 continues to receive more obtained sensor data when applying the model.

In some implementations, the neural network model 232 may be trained to provide the description of the type of the alarm from the set of training data. For instance, a specific type of user behavior data 202 and a specific type of account status over time data 220 may produce a particular description of the type of the alarm. In one example, if the occupancy data 204 is low, the sensory activity 206 is low, and the arming behavior 208 is low, the neural network model 232 may be trained to predict an alarm event of "breaking and entering" 136 due to a frequently empty and unarmed residential facility 102. Other description types may be possible according to the set of input data provided to the model trainer 230.

Figure 3:
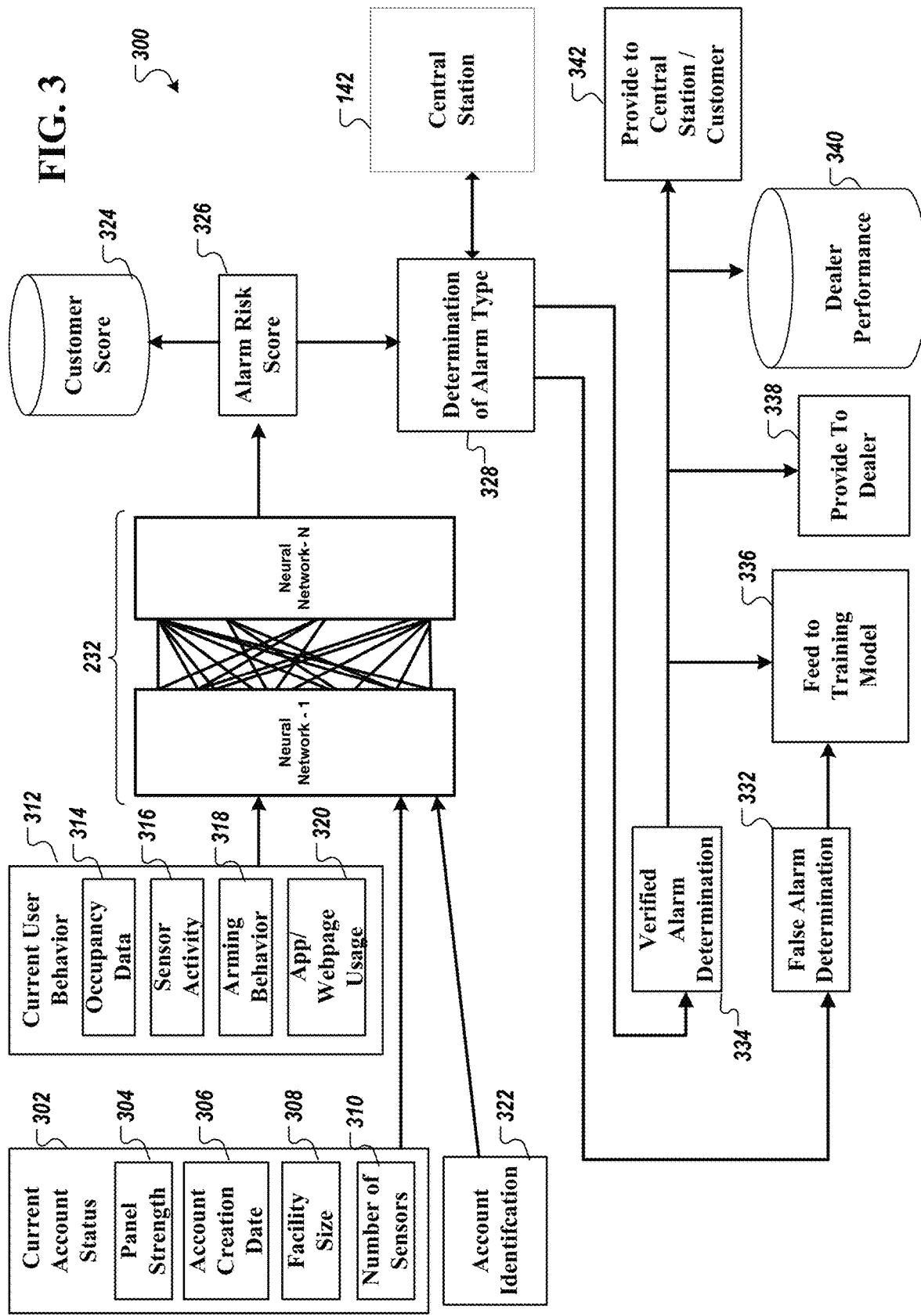
FIG. 3 is contextual diagram of an example system for providing a score representing a likelihood of an alarm to a monitored residential facility.

FIG. 3 is contextual diagram of an example system 300 for providing a score representing a likelihood of an alarm to a monitored residential facility. The system 300 applies the trained model 232 to generate an alarm risk score 326 for each residential facility 102. The system 300 may apply the current parameters of a particular residential facility 102 to the trained model 232 in response to the base station 144 requesting sensor data from the particular residential facility 102. In some implementations, the base station 144 of FIG. 1 may apply the trained model 232.

In some implementations, the system 300 receives sensor data for a particular residential facility 102 obtained from its respective central station 142. The sensor data indicates a current set of data for the particular residential facility 102. The current set of data can include a current account status 302, a current user behavior 312, and an account identification 322. The current account status 302 includes a panel strength 304, an account creation date 306, a facility size 308, and number of sensors 310. The current user behavior 312 includes occupancy data 314, sensor activity 316, arming behavior 318, and app/webpage usage 320. In some implementations, the current account status 302 and the current user behavior 312 includes data provided over a period of time. The period of time can be shorter than the period of time utilized during training of the model 232.

The system 300 applies the current account status 302, the current user behavior 312, and the account identification 322 to the trained model 232. The trained model 232 generates an alarm risk score 326 for the residential facility 102. For example, the alarm risk score 326 may include a number ranging from 0 to 100%. The higher the alarm risk score 326 the higher the likelihood of an alarm event. The alarm risk score 326 indicates an alarm risk value corresponding to each account identifier from the account identification information 322. Specifically, the alarm risk score 326 indicates an alarm risk value corresponding to the particular residential facility 102 indicated by the account identification information 322.

In some implementations, the base station 144 stores data in the customer score database 324. The data stored in the customer score database 324 includes the account identification information 322 and the corresponding generated alarm risk score 326. The base station 144 stores this data in the customer score database 324 for training the model and for other comparisons, such as determining whether the alarm is a verified alarm or a false alarm.

In some implementations, the base station 144 determines an alarm type 328 from the alarm risk score 326. The base station 144 compares the alarm risk score 326 to a predetermined threshold to verify whether the user corresponding to the residential facility 102 and the dealer that installed the security system in the residential facility 102 should be notified. For example, if the alarm risk score 326 is less than a predetermined threshold of 50%, then the alarm risk score 326 is discarded. Otherwise, the base station 144 transmits the alarm risk score 326 to the central station 102 that monitors the particular residential facility 102 and the dealer that installed the dealer 146.

In some implementations, the base station 144 may determine whether the alarm risk score 326 is a verified alarm or a false alarm. If a false alarm determination 332 is made, then the alarm risk score 326, the current account status 302, the current user behavior 312, and the account identification 322 is provided to the training model 336. The false alarm data is provided to the training model 336 so that the model 232 can be tuned to detect future false alarms of this type. The base station 144 determines a false alarm type or a verified alarm type from the alarm risk score 326 by communicating with the central station 102 corresponding to the particular residential facility 102. For instance, the base station 144 analyzes previous alarm risk scores sent to the particular residential facility 102 and determines whether the previously sent alarm risk scores initiated the action of the central station 142 contacting the local police station 150.

Additionally, the system 300 may implement a feedback mechanism such that determines whether the police from the local police station 150 were dispatched to the particular residential facility 102 and what the results of the police findings were in response to the central station 142 contacting the local police station 150. This information regarding the results of the police findings can be uploaded via the app/webpage from the client device 124-A or entered into the security panel 120 to provide to the corresponding central station 142. The central station 142 will provide the results of the police findings to the model trainer 230 as either verified alarm data 212 or false alarm data 214 to fine tune the model 232.

In some implementations, if a verified alarm determination 334 is made, then the alarm risk score 326, the current account status 302, the current user behavior 312, and the account identification 211 is provided to the training model 232. The verified alarm data is provided to the training model 336 so that the model 232 can be tuned to detect future verified alarms of this type. In addition, the base station 144 provides the verified alarm to the dealer in 338 who installed the security system in the particular residential facility 102.

In some implementations, the base station 144 provides data to a dealer performance database 340. The dealer performance database 340 may be located at the base station 144. The dealer performance database 340 may receive data corresponding to the current account status 302, the current user behavior 312, the account identification 322, the generated alarm risk score 326, and the corresponding dealer 146-A. This allows the base station 144 to maintain track of high quality and low quality dealers 146-A through 146-N. The base station 144 may be able to provide rankings for each of the dealers to clients, such as users 122, 126, and 134.

In some implementations, the base station 144 can train the neural network model 232 to detect one or more missed alarms. For instance, some residential facility 102 security systems may miss preventing or detecting an alarm event after the alarm event has occurred. This may be due to user error or an inefficient security system, such as the user forgetting to enable the arm home signature profile or disconnecting the security panel 20 or the control unit server 104. In some implementations, the neural network model 232 in the base station 144 may be trained to recognize patterns that identify one or more missed alarm events. For example, using the obtained sensor data from each residential facility 102, the model trainer 230 can train the neural network model 232 to detect user error or detect inefficient components in the security system that leads to a missed detection alarm event. In some implementations, the base station 144 can train the neural network model 232 to indicate an alarm risk score 326 that denotes a risk for a missed detection event. The base station 144 can provide the alarm risk score 326 to each client device of a user or a security panel 20 corresponding to the residential facility 102.

In some implementations, the base station 144 can train the neural network model 232 to determine an overall performance for each of the dealers 146. For instance, some dealers may poorly install security systems in the residential facilities 102 that may lead to a high count of false alarms, missed alarms, and a low count of verified alarms. The neural network model 232 may be trained to assign a risk score to each of the dealers 146 using the obtained sensor data from each of the residential facilities 102. For example, once each of the dealers 146 have installed at least 1000 security systems in the residential facilities 102, the neural network model 232 can be sufficiently trained to provide a risk score for each of the dealers to compare the safety and quality of work between each of the dealers 146. As a result, the base station 144 can provide a ranked listing of dealers to the users based on false alarm and missed alarm rates. The less false alarm and missed alarm rates a dealer 146 has, the higher the rank of the dealer 146. This may incentivize dealers to improve the installed security systems since lower false alarm and missed alarm rates indicate a higher quality of work.

FIG. 4 is a flowchart of an example process 400 for training a neural network model for predictive alarm analytics. Generally, the process 400 includes obtaining data from one or more sensors from one or more monitoring facilities; analyzing user behavior information from the data corresponding to each of the one or more monitoring facilities; analyzing account status information from the data corresponding to each of the one or more monitoring facilities; analyzing geographic information from the data corresponding to each of the one or more monitoring facilities; and, providing the user behavior information, the account status information, the geographic information, and an account identifier to train a neural network model to identify whether each of the one or more monitoring facilities is at risk for an alarm.

During 402, the central server 142 obtains data from one or more sensors from one or more monitoring facilities. In some implementations, the central server 142 may communicate with a control unit server 104 located in each residential facility 102 to retrieve the sensor data. The sensor data 141 may include data from the speakers 108, the cameras 110, the lights 112, the sensors 114, the home devices 116, and the security panel 120. The base station 144 may require the central server 142-A to retrieve sensor data 141 over a period of time. For example, the base station 144 may require sensor data 141 from each of the residential facilities 102 over the past 1 year. In addition, the base station 144 may require the central server 142 to retrieve sensor data 141 at a present moment in time. For example, the base station 144 may require sensor data 141 from each of the residential facilities 102 at the present time.

During 404, the base station 144 analyzes user behavior information from the data corresponding to each of the one or more monitoring facilities. The user behavior information includes occupancy data 204, sensor activity 206, arming behavior 208, and app/webpage usage 210. The occupancy data 204 indicates how many users occupy the residential facility 102 during different times of the day. The sensor activity 206 indicates data provided by the one or more sensors 114 for the residential facility 102. For example, the data may include detected events, such as motion detection or locked contact detection, or non-detected events, such as data indicating non-motion or unlocked detection data, during various times of the day. The arming behavior 208 includes a number of times a user 122 armed the residential property 102 by enabling the arm home signature profile over a period of time. The app/webpage usage 210 may include a number of times user 122 interacts with the web interface or the application on a respective client device 124-A over a period of time. In some implementations, the period of time may be over a period of 24 hours. In other implementations, the period of time may be over an entire year.

During 406, the base station 144 analyzes account status information from the data corresponding to each of the one or more monitoring facilities. In some implementations, the account status over time information 220 includes panel strength 222, number of sensors 224, account creation date 226, and facility size 228. The panel strength 222 includes an indication of a signal strength of the security panel 120. For instance, the signal strength of the security panel 120 may be represented by a received signal strength indicator (RSSI) as indicated by the control unit server 104. For example, the RSSI can be values ranging from −40 decibel-milliwatts (dBm) to −100 dBm. The number of sensors 224 may include a number of one or more sensors 114 in the residential facility 102. For example, an unusual number of sensors 224 may exist such as too little a number or too high a number. The account creation date 226 may include a date at which a dealer 146-A set up the security system including the control unit server 104 and the one or more sensors 114 at the residential facility 102.

During 408, the base station 144 analyzes geographic information from the data corresponding to each of the one or more monitoring facilities. The geographic regions may correspond to a city, a county, a neighborhood, or any other region that group together one or more monitored facilities 102. A central station, such as central station 142-A may be assigned to monitor each residential facility 102-A through 102-N corresponding to a geographic region.

During 410, the base station 144 provides the user behavior information, the account status information, the geographic information, and an account identifier to train a neural network model to identify whether each of the one or more monitoring facilities is at risk for an alarm. For instance, for each residential facility 102, a model trainer 230 receives user behavior over time information 202, account status over time information 220, account identification information 218, geographic data information 216 pertaining to the residential facility 102, false alarm data 214 for that residential facility 102, and verified alarm data 212 for that residential facility 102. The model trainer 230 uses each of the obtained input to train a neural network model 322 or any other type of machine learning model.

FIG. 5 is a flowchart of an example process 500 for providing a score representing a likelihood of an alarm to a monitored facility. Generally, process 500 includes obtaining data from one or more sensors of a first monitoring property; providing a current user behavior, a current account status, geographic information, and an account identification information corresponding to the data from the first monitoring property to a trained neural network model to produce an indication score of whether the first monitoring property is at risk for an alarm; comparing the indication score to a predetermined threshold to determine whether to alert a user corresponding to the first monitoring property and a dealer that installed an alarm system at the first monitoring property that the first monitoring property is at risk for an alarm; determining a category of the alarm the first monitoring property is at risk for based on a data integration with a central station that corresponds to the first monitoring property; determining whether the category of the alarm for the first monitoring property is a false alarm or a verified alarm; and, based on a determination of whether the category of the alarm for the first monitoring property is a false alarm or a verified alarm, providing the false alarm to a training model of the neural network model or providing the verified alarm to the user corresponding to the first monitoring property.

During 502, the base station 144 obtains data from one or more sensors of a first monitoring property. In some implementations, the base station 144 obtains sensor data for a particular residential facility 102 from its respective central station 142. The sensor data indicates a current set of data for the particular residential facility 102. The current set of data can include a current account status 302, a current user behavior 312, and an account identification 322. The current account status 302 includes a panel strength 304, an account creation date 306, a facility size 308, and number of sensors 310. The current user behavior 312 includes occupancy data 314, sensor activity 316, arming behavior 318, and app/webpage usage 320. In some implementations, the current account status 302 and the current user behavior 312 includes data provided over a period of time. The period of time is shorter than the period of time utilized during training.

During 504, the base station 144 provides a current user behavior, a current account status, geographic information, and an account identification information corresponding to the data from a residential facility 102 to a trained neural network model to produce an indication score of whether the first monitoring property is at risk for an alarm. In some implementations, the trained neural network model, such as the trained neural network model 232, generates an alarm risk score 326 for the residential facility 102 identified in the account identification information. The alarm risk score 326 indicates an alarm risk value corresponding to the particular residential facility 102 indicated by the account identification information 322. For example, the alarm risk score 326 may include a number ranging from 0 to 100%.

During 506, the base station 144 compares the indication score to a predetermined threshold to determine whether to alert a user corresponding to the first monitoring property and a dealer that installed an alarm system at the first monitoring property that the first monitoring property is at risk for an alarm. In some implementations, the base station 144 compares the alarm risk score 326 to a predetermined threshold to verify whether the user corresponding to the residential facility 102 should be notified. For example, if the alarm risk score 326 is less than a predetermined threshold of 50%, then the alarm risk score 326 is discarded. Otherwise, the base station 144 transmits the alarm risk score 326 to the central station 102 that monitors the particular residential facility 102.

During 508, the base station 144 determines whether the category of the alarm is either a false alarm or a verified alarm for the first monitoring property based on a data integration with a central station that corresponds to the first monitoring property. The base station 144 determines a false alarm type or a verified alarm type from the alarm risk score 326 by communicating with the central station 102 corresponding to the particular residential facility 102. For instance, the base station 144 analyzes previous alarm risk scores sent to the particular residential facility 102 and determines whether the previously sent alarm risk scores initiated the action of the central station 142 contacting the local police station 150. Additionally, the system 300 may implement a feedback mechanism such that determines whether the police from the local police station 150 were dispatched to the particular residential facility 102 and what the results of the police findings were in response to the central station 142 contacting the local police station 150. This information regarding the results of the police findings can be uploaded via the app/webpage from the client device 124-A or entered into the security panel 120 to provide to the corresponding central station 142. The central station 142 will provide the results of the police findings to the model trainer 230 as either verified alarm data 212 or false alarm data 214 to fine tune the model 232.

During 510, the base station 144 provides the false alarm to a training model of the neural network model or provides the verified alarm to the user corresponding to the first monitoring property based on a determination of whether the category of the alarm for the first monitoring property is a false alarm or a verified alarm. The verified alarm data, such as the alarm risk score 326, the current account status 302, the current user behavior 312, and the account identification 322 is provided to the training model 336 so that the model 232 can be tuned to detect future verified alarms of this type. In addition, the base station provides the verified alarm to the dealer in 338 who installed the security system in the particular residential facility 102. If a false alarm determination 332 is made, then the alarm risk score 326, the current account status 302, the current user behavior 312, and the account identification 322 is provided to the training model 336. The false alarm data is provided to the training model 336 so that the model 232 can be tuned to detect future false alarms of this type.

Figure 6:
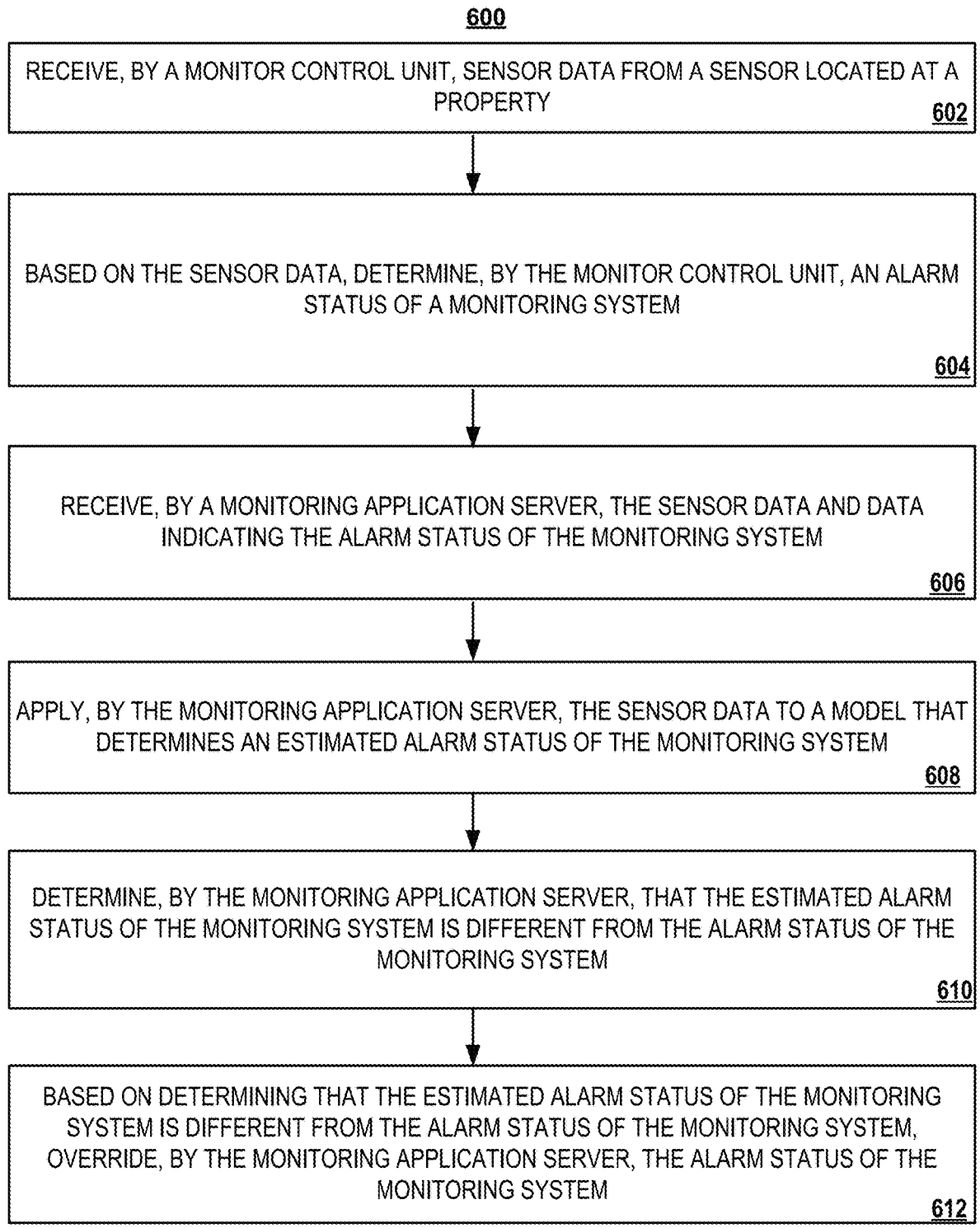
FIG. 6 is a flowchart of an example system for overriding an alarm status of a monitored facility.

FIG. 6 is a flowchart 600 of an example system for overriding an alarm status of a monitored facility. Generally, process 600 includes receiving, by a monitor control unit, sensor data from a sensor located at a property; based on the sensor data, determine, by the monitor control unit, an alarm status of a monitoring system; receive, by a monitoring application server, the sensor data and data indicating the alarm status of the monitoring system; apply, by the monitoring application server, the sensor data to a model that determines an estimated alarm status of the monitoring system; determine, by the monitoring application server, that the estimated alarm status of the monitoring system is different from the alarm status of the monitoring system; and, based on determining that the estimated alarm status of the monitoring system is different from the alarm status of the monitoring system, override, by the monitoring application server, the alarm status of the monitoring system.

During 602, a monitor control unit (such as the control unit server 104) receives sensor data from a sensor located at a property. The sensor data can also be from multiple sensors. Similar to 502, the monitor control unit can receive sensor data that includes a current account status 302, a current user behavior 312, and an account identification 322. The current account status 302 includes a panel strength 304, an account creation date 306, a facility size 308, and number of sensors 310. The current user behavior 312 includes occupancy data 314, sensor activity 316, arming behavior 318, and app/webpage usage 320. In some implementations, the current account status 302 and the current user behavior 312 includes data provided over a period of time. The period of time is shorter than the period of time utilized during training.

Additionally, the monitor control unit can receive sensor data from the one or more cameras 110, the one or more lights 112, the one or more home device 117, the one or more sensors 114, and the security panel 120. The monitor control unit can receive the sensor data from each of these devices over a network, such as network 106. The monitor control unit can also receive sensor data from a client device of the homeowner, such as user 122, to compile in the sensor data.

During 604, based on the sensor data, the monitor control unit determines an alarm status of a monitoring system. In particular, the monitor control unit can determine that the alarm status of the monitoring system is set to various alarms. For example, the monitor control unit may set the monitoring system to a normal operating state, such that no heightened alarm event has occurred. In another example, the monitor control unit may determine that the monitoring system is set to a low alarm state, such that the monitoring system is at risk for a small indication of an alarm. For example, a low alarm state may be set if the monitor control unit determines that a window is opened or a door is unlocked when no user is inside the monitoring system. In another example, the monitor control unit may determine that the monitoring system is set to a high alarm state, such that the monitoring system is at risk for a high indication of an alarm. For example, a high alarm state may be set if the monitor control unit determines that a smoke alarm has gone off and all of the windows and doors in the monitoring system are closed.

During 606, a monitoring application server receives the sensor data and data indicating the alarm status of the monitoring system. In some implementations, the control unit server 104 provides the sensor data and the data indicating the alarm status to the monitoring application server, such as the base station 144, over the network 140. The base station can store the received sensor data and the data indicating the alarm status of the monitoring system for the property, such as property 104.

During 608, the monitoring application server applies the sensor data to a model that determines an estimated alarm status of the monitoring system. In particular, the base station 144 provides the sensor data, such as the current user behavior, the current account status, geographic information, and an account identification information corresponding to the residential facility 102 to a trained neural network model to produce an indication score of whether the first monitoring property is at risk for an alarm. In some implementations, the trained neural network model, such as the trained neural network model 232, generates an alarm risk score 326 for the residential facility 102 identified in the account identification information. The alarm risk score 326 indicates an alarm risk value corresponding to the particular residential facility 102 indicated by the account identification information 322. For example, the alarm risk score 326 may include a number ranging from 0 to 100%.

In some implementations, the trained neural network model can output a description from the type of the alarm. For example, a specific type of user behavior data 202 and a specific type of account status over time data 220 may produce a particular description of the type of the alarm. In one example, if the occupancy data 204 is low, the sensory activity 206 is low, and the arming behavior 208 is low, the neural network model 232 may be trained to predict an alarm event of "breaking and entering" 136 due to a frequently empty and unarmed residential facility 102. Other description types may be possible according to the set of input data.

The base station 144 compares the output alarm risk score 326 to a predetermined threshold. In some implementations, the base station 144 compares the alarm risk score 326 to a predetermined threshold to verify whether the user corresponding to the residential facility 102 should be notified. For example, if the alarm risk score 326 is less than a predetermined threshold of 50%, then the alarm risk score 326 is discarded. Otherwise, the base station 144 transmits the alarm risk score 326 to the central station 102 that monitors the particular residential facility 102.

In other implementations, the alarm risk score 326 can be used as an indication to predict an accuracy of an alarm event. For example, if the alarm risk score 326 is below 10%, then the base station 144 can discard the alarm risk score 326. If the alarm risk score 326 falls in between a range, such as 11% to 60%, then the base station 144 can estimate there a risk for an alarm to occur for a corresponding residential monitored property. Additionally, if the alarm risk score 326 is above these two ranges, such that it falls between 61% to 100%, then the base station 144 can indicate that an alarm will occur at the corresponding residential monitored property 102. Additionally, if the alarm risk score 326 falls below the 10% range or above the 61% range, then the base station 144 proceeds to an override zone. In the override zone, the base station 144 determines whether to compare the output of the trained neural network model to the alarm status of the monitoring system, as performed in 610.

Similar to 508, the base station 144 determines whether the category of the estimated alarm is either a false alarm or a verified alarm for the first monitoring property based on a data integration with a central station that corresponding to the first monitoring property. The base station 144 determines a false alarm type or a verified alarm type from the alarm risk score 326 by communicating with the central station 102 corresponding to the particular residential facility 102. For instance, the base station 144 analyzes previous alarm risk scores sent to the particular residential facility 102 and determines whether the previously sent alarm risk scores initiated the action of the central station 142 contacting the local police station 150.

During 610, the monitoring application server determines that the estimated alarm status of the monitoring system is different from the alarm status of the monitoring system. Given the output of the description of the type of the alarm, the base station 144 can determine that the data received from the monitor control unit that indicates the alarm status of the monitoring system is different or similar to the estimated alarm status of the monitoring system. For example, the alarm status from the monitor control unit may indicate that the monitoring system is in a normal operating state, while the estimated alarm status from the trained neural network model indicates a possible "breaking and entering" event. Thus, the base station 144 can determine for that respective monitored property that the estimated alarm status and the received alarm status of the monitoring system is different. Additionally, if the base station 144's determined category of the estimated alarm from 608 is a verified alarm and the base station determines the estimated alarm status of the monitoring system is different from the alarm status of the monitoring system, the base station 144 proceeds to override the alarm status of the monitoring system. Otherwise, if the base station 144's determined category of the estimated alarm from 608 is a false alarm and the base station determines the estimated alarm status of the monitoring system is different from the alarm status of the monitoring system, the base station 144 proceeds to store the estimated alarm risk and alarm risk score 326 in memory and not override the alarm status of the monitoring system.

During 612, based on determining that the estimated alarm status of the monitoring system is different from the alarm status of the monitoring system, override, by the monitoring application server, the alarm status of the monitoring system. As a result of determining that the estimated alarm status is different from the received alarm status of the monitoring system, the base station 144 can override the alarm status of the monitoring system by transmitting a notification to the monitor control unit at the monitored property, such as the control unit server 104 at the residential facility 102-A, to change the alarm status. Additionally, the base station 144 can transmit the notification to the client device 124-A of the homeowner 122 to notify the homeowner 122 of the alarm status of his or her current property.

Figure 7:
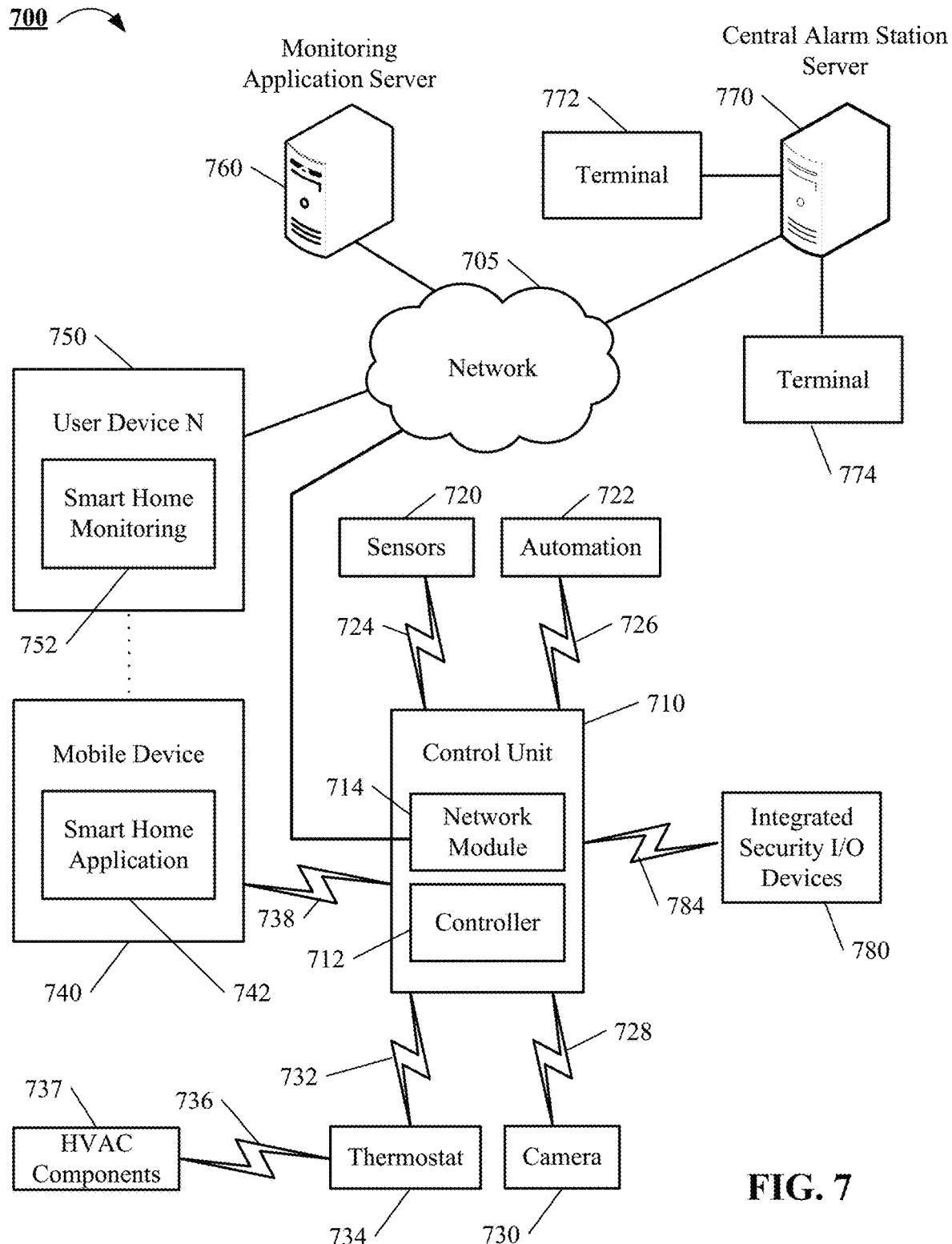
FIG. 7 is a block diagram of an example integrated security environment for predicting an alarm event that may utilize various security components.

FIG. 7 is a block diagram of an example integrated security environment 700 for predicting an alarm event that may utilize various security components. The electronic system 700 includes a network 705, a control unit 710, one or more user devices 740 and 750, a monitoring application server 760, and a central alarm station server 770. In some examples, the network 705 facilitates communications between the control unit 710, the one or more user devices 740 and 750, the monitoring application server 760, and the central alarm station server 770.

The network 705 is configured to enable exchange of electronic communications between devices connected to the network 705. For example, the network 705 may be configured to enable exchange of electronic communications between the control unit 710, the one or more user devices 740 and 750, the monitoring application server 760, and the central alarm station server 770. The network 705 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 705 may include multiple networks or subnetworks, each of which may include, for example, a wired or wireless data pathway. The network 705 may include a circuit-switched network, a packet-switched data network, or any other network able to carry electronic communications (e.g., data or voice communications). For example, the network 705 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 705 may include one or more networks that include wireless data channels and wireless voice channels. The network 705 may be a wireless network, a broadband network, or a combination of networks including a wireless network and a broadband network.

The control unit 710 includes a controller 712 and a network module 714. The controller 712 is configured to control a control unit monitoring system (e.g., a control unit system) that includes the control unit 710. In some examples, the controller 712 may include a processor or other control circuitry configured to execute instructions of a program that controls operation of a control unit system. In these examples, the controller 712 may be configured to receive input from sensors, flow meters, or other devices included in the control unit system and control operations of devices included in the household (e.g., speakers, lights, doors, etc.). For example, the controller 712 may be configured to control operation of the network module 714 included in the control unit 710.

The network module 714 is a communication device configured to exchange communications over the network 705. The network module 714 may be a wireless communication module configured to exchange wireless communications over the network 705. For example, the network module 714 may be a wireless communication device configured to exchange communications over a wireless data channel and a wireless voice channel. In this example, the network module 714 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 714 also may be a wired communication module configured to exchange communications over the network 705 using a wired connection. For instance, the network module 714 may be a modem, a network interface card, or another type of network interface device. The network module 714 may be an Ethernet network card configured to enable the control unit 710 to communicate over a local area network and/or the Internet. The network module 714 also may be a voiceband modem configured to enable the alarm panel to communicate over the telephone lines of Plain Old Telephone Systems (POTS).

The control unit system that includes the control unit 710 includes one or more sensors. For example, the monitoring system may include multiple sensors 720. The sensors 720 may include a lock sensor, a contact sensor, a motion sensor, or any other type of sensor included in a control unit system. The sensors 720 also may include an environmental sensor, such as a temperature sensor, a water sensor, a rain sensor, a wind sensor, a light sensor, a smoke detector, a carbon monoxide detector, an air quality sensor, etc. The sensors 720 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 720 may include a radio-frequency identification (RFID) sensor that identifies a particular article that includes a pre-assigned RFID tag.

The control unit 710 communicates with the module 722 and the camera 730 to perform monitoring. The module 722 is connected to one or more devices that enable home automation control. For instance, the module 722 may be connected to one or more lighting systems and may be configured to control operation of the one or more lighting systems. Also, the module 722 may be connected to one or more electronic locks at the property and may be configured to control operation of the one or more electronic locks (e.g., control Z-Wave locks using wireless communications in the Z-Wave protocol. Further, the module 722 may be connected to one or more appliances at the property and may be configured to control operation of the one or more appliances. The module 722 may include multiple modules that are each specific to the type of device being controlled in an automated manner. The module 722 may control the one or more devices based on commands received from the control unit 710. For instance, the module 722 may cause a lighting system to illuminate an area to provide a better image of the area when captured by a camera 730.

The camera 730 may be a video/photographic camera or other type of optical sensing device configured to capture images. For instance, the camera 730 may be configured to capture images of an area within a building or within a residential facility 102-A monitored by the control unit 710. The camera 730 may be configured to capture single, static images of the area and also video images of the area in which multiple images of the area are captured at a relatively high frequency (e.g., thirty images per second). The camera 730 may be controlled based on commands received from the control unit 710.

The camera 730 may be triggered by several different types of techniques. For instance, a Passive Infra-Red (PIR) motion sensor may be built into the camera 730 and used to trigger the camera 730 to capture one or more images when motion is detected. The camera 730 also may include a microwave motion sensor built into the camera and used to trigger the camera 730 to capture one or more images when motion is detected. The camera 730 may have a "normally open" or "normally closed" digital input that can trigger capture of one or more images when external sensors (e.g., the sensors 720, PIR, door/window, etc.) detect motion or other events. In some implementations, the camera 730 receives a command to capture an image when external devices detect motion or another potential alarm event. The camera 730 may receive the command from the controller 712 or directly from one of the sensors 720.

In some examples, the camera 730 triggers integrated or external illuminators (e.g., Infra-Red, Z-wave controlled "white" lights, lights controlled by the module 722, etc.) to improve image quality when the scene is dark. An integrated or separate light sensor may be used to determine if illumination is desired and may result in increased image quality.

The camera 730 may be programmed with any combination of time/day schedules, system "arming state", or other variables to determine whether images should be captured or not when triggers occur. The camera 730 may enter a low-power mode when not capturing images. In this case, the camera 730 may wake periodically to check for inbound messages from the controller 712. The camera 730 may be powered by internal, replaceable batteries if located remotely from the control unit 710. The camera 730 may employ a small solar cell to recharge the battery when light is available. Alternatively, the camera 730 may be powered by the controller's 712 power supply if the camera 730 is co-located with the controller 712.

In some implementations, the camera 730 communicates directly with the monitoring application server 760 over the Internet. In these implementations, image data captured by the camera 730 does not pass through the control unit 710 and the camera 730 receives commands related to operation from the monitoring application server 760.

The system 700 also includes thermostat 734 to perform dynamic environmental control at the property. The thermostat 734 is configured to monitor temperature and/or energy consumption of an HVAC system associated with the thermostat 734, and is further configured to provide control of environmental (e.g., temperature) settings. In some implementations, the thermostat 734 can additionally or alternatively receive data relating to activity at a property and/or environmental data at a property, e.g., at various locations indoors and outdoors at the property. The thermostat 734 can directly measure energy consumption of the HVAC system associated with the thermostat, or can estimate energy consumption of the HVAC system associated with the thermostat 734, for example, based on detected usage of one or more components of the HVAC system associated with the thermostat 734. The thermostat 734 can communicate temperature and/or energy monitoring information to or from the control unit 710 and can control the environmental (e.g., temperature) settings based on commands received from the control unit 710.

In some implementations, the thermostat 734 is a dynamically programmable thermostat and can be integrated with the control unit 710. For example, the dynamically programmable thermostat 734 can include the control unit 710, e.g., as an internal component to the dynamically programmable thermostat 734. In addition, the control unit 710 can be a gateway device that communicates with the dynamically programmable thermostat 734.

A module 737 is connected to one or more components of an HVAC system associated with a property, and is configured to control operation of the one or more components of the HVAC system. In some implementations, the module 737 is also configured to monitor energy consumption of the HVAC system components, for example, by directly measuring the energy consumption of the HVAC system components or by estimating the energy usage of the one or more HVAC system components based on detecting usage of components of the HVAC system. The module 737 can communicate energy monitoring information and the state of the HVAC system components to the thermostat 734 and can control the one or more components of the HVAC system based on commands received from the thermostat 734.

In some examples, the system 700 further includes one or more robotic devices. The robotic devices may be any type of robots that are capable of moving and taking actions that assist in security monitoring. For example, the robotic devices may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and also roll along the ground, walls, or ceiling) and land vehicle type devices (e.g., automated cars that drive around a property). In some cases, the robotic devices may be robotic devices that are intended for other purposes and merely associated with the system 700 for use in appropriate circumstances. For instance, a robotic vacuum cleaner device may be associated with the monitoring system 700 as one of the robotic devices and may be controlled to take action responsive to monitoring system events.

In some examples, the robotic devices automatically navigate within a property. In these examples, the robotic devices include sensors and control processors that guide movement of the robotic devices within the property. For instance, the robotic devices may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices may include control processors that process output from the various sensors and control the robotic devices to move along a path that reaches the desired destination and avoids obstacles. In this regard, the control processors detect walls or other obstacles in the property and guide movement of the robotic devices in a manner that avoids the walls and other obstacles.

In addition, the robotic devices may store data that describes attributes of the property. For instance, the robotic devices may store a floorplan and/or a three-dimensional model of the property that enables the robotic devices to navigate the property. During initial configuration, the robotic devices may receive the data describing attributes of the property, determine a frame of reference to the data (e.g., a home or reference location in the property), and navigate the property based on the frame of reference and the data describing attributes of the property. Further, initial configuration of the robotic devices also may include learning of one or more navigation patterns in which a user provides input to control the robotic devices to perform a specific navigation action (e.g., fly to an upstairs bedroom and spin around while capturing video and then return to a home charging base). In this regard, the robotic devices may learn and store the navigation patterns such that the robotic devices may automatically repeat the specific navigation actions upon a later request.

In some examples, the robotic devices may include data capture and recording devices. In these examples, the robotic devices may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users in the property. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices to take and store a biometric sample that can be used to identify the person (e.g., a biometric sample with DNA that can be used for DNA testing).

In some implementations, the robotic devices may include output devices. In these implementations, the robotic devices may include one or more displays, one or more speakers, and/or any type of output devices that allow the robotic devices to communicate information to a nearby user.

The robotic devices also may include a communication module that enables the robotic devices to communicate with the control unit 710, each other, and/or other devices. The communication module may be a wireless communication module that allows the robotic devices to communicate wirelessly. For instance, the communication module may be a Wi-Fi module that enables the robotic devices to communicate over a local wireless network at the property. The communication module further may be a 900 MHz wireless communication module that enables the robotic devices to communicate directly with the control unit 710. Other types of short-range wireless communication protocols, such as Bluetooth, Bluetooth LE, Zwave, Zigbee, etc., may be used to allow the robotic devices to communicate with other devices in the property.

The robotic devices further may include processor and storage capabilities. The robotic devices may include any suitable processing devices that enable the robotic devices to operate applications and perform the actions described throughout this disclosure. In addition, the robotic devices may include solid state electronic storage that enables the robotic devices to store applications, configuration data, collected sensor data, and/or any other type of information available to the robotic devices.

The robotic devices are associated with one or more charging stations. The charging stations may be located at predefined home base or reference locations in the property. The robotic devices may be configured to navigate to the charging stations after completion of tasks needed to be performed for the monitoring system 700. For instance, after completion of a monitoring operation or upon instruction by the control unit 710, the robotic devices may be configured to automatically fly to and land on one of the charging stations. In this regard, the robotic devices may automatically maintain a fully charged battery in a state in which the robotic devices are ready for use by the monitoring system 700.

The charging stations may be contact based charging stations and/or wireless charging stations. For contact based charging stations, the robotic devices may have readily accessible points of contact that the robotic devices are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices may charge through a wireless exchange of power. In these cases, the robotic devices need only locate themselves closely enough to the wireless charging stations for the wireless exchange of power to occur. In this regard, the positioning needed to land at a predefined home base or reference location in the property may be less precise than with a contact based charging station. Based on the robotic devices landing at a wireless charging station, the wireless charging station outputs a wireless signal that the robotic devices receive and convert to a power signal that charges a battery maintained on the robotic devices.

In some implementations, each of the robotic devices has a corresponding and assigned charging station such that the number of robotic devices equals the number of charging stations. In these implementations, the robotic devices always navigate to the specific charging station assigned to that robotic device. For instance, a first robotic device may always use a first charging station and a second robotic device may always use a second charging station.

In some examples, the robotic devices may share charging stations. For instance, the robotic devices may use one or more community charging stations that are capable of charging multiple robotic devices. The community charging station may be configured to charge multiple robotic devices in parallel. The community charging station may be configured to charge multiple robotic devices in serial such that the multiple robotic devices take turns charging and, when fully charged, return to a predefined home base or reference location in the property that is not associated with a charger. The number of community charging stations may be less than the number of robotic devices.

Also, the charging stations may not be assigned to specific robotic devices and may be capable of charging any of the robotic devices. In this regard, the robotic devices may use any suitable, unoccupied charging station when not in use. For instance, when one of the robotic devices has completed an operation or is in need of battery charge, the control unit 710 references a stored table of the occupancy status of each charging station and instructs the robotic device to navigate to the nearest charging station that is unoccupied.

The system 700 further includes one or more integrated security devices 780. The one or more integrated security devices may include any type of device used to provide alerts based on received sensor data. For instance, the one or more control units 710 may provide one or more alerts to the one or more integrated security input/output devices. Additionally, the one or more control units 710 may receive one or more sensor data from the sensors 720 and determine whether to provide an alert to the one or more integrated security input/output devices 780.

The sensors 720, the module 722, the camera 730, the thermostat 734, and the integrated security devices 780 communicate with the controller 712 over communication links 724, 726, 728, 732, 784, and 786. The communication links 724, 726, 728, 732, 784, and 786 may be a wired or wireless data pathway configured to transmit signals from the sensors 720, the module 722, the camera 730, the thermostat 734, and the integrated security devices 780 to the controller 712. The sensors 720, the module 722, the camera 730, the thermostat 734, and the integrated security devices 780 may continuously transmit sensed values to the controller 712, periodically transmit sensed values to the controller 712, or transmit sensed values to the controller 712 in response to a change in a sensed value.

The communication links 724, 726, 728, 732, 784, and 786 may include a local network. The sensors 720, the module 722, the camera 730, the thermostat 734, and the integrated security devices 780, and the controller 712 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 7 (CAT6) wired Ethernet network. The local network may be a mesh network constructed based on the devices connected to the mesh network.

The monitoring application server 760 is an electronic device configured to provide monitoring services by exchanging electronic communications with the control unit 710, the one or more user devices 740 and 750, and the central alarm station server 770 over the network 705. For example, the monitoring application server 760 may be configured to monitor events (e.g., alarm events) generated by the control unit 710. In this example, the monitoring application server 760 may exchange electronic communications with the network module 714 included in the control unit 710 to receive information regarding events (e.g., alerts) detected by the control unit server 104a. The monitoring application server 760 also may receive information regarding events (e.g., alerts) from the one or more user devices 740 and 750.

In some examples, the monitoring application server 760 may route alert data received from the network module 714 or the one or more user devices 740 and 750 to the central alarm station server 770. For example, the monitoring application server 760 may transmit the alert data to the central alarm station server 770 over the network 705.

The monitoring application server 760 may store sensor and image data received from the monitoring system and perform analysis of sensor and image data received from the monitoring system. Based on the analysis, the monitoring application server 760 may communicate with and control aspects of the control unit 710 or the one or more user devices 740 and 750.

The central alarm station server 770 is an electronic device configured to provide alarm monitoring service by exchanging communications with the control unit 710, the one or more mobile devices 740 and 750, and the monitoring application server 760 over the network 705. For example, the central alarm station server 770 may be configured to monitor alerting events generated by the control unit 710. In this example, the central alarm station server 770 may exchange communications with the network module 714 included in the control unit 710 to receive information regarding alerting events detected by the control unit 710. The central alarm station server 770 also may receive information regarding alerting events from the one or more mobile devices 740 and 750 and/or the monitoring application server 760.

The central alarm station server 770 is connected to multiple terminals 772 and 774. The terminals 772 and 774 may be used by operators to process alerting events. For example, the central alarm station server 770 may route alerting data to the terminals 772 and 774 to enable an operator to process the alerting data. The terminals 772 and 774 may include general-purpose computers (e.g., desktop personal computers, workstations, or laptop computers) that are configured to receive alerting data from a server in the central alarm station server 770 and render a display of information based on the alerting data. For instance, the controller 712 may control the network module 714 to transmit, to the central alarm station server 770, alerting data indicating that a sensor 720 detected motion from a motion sensor via the sensors 720. The central alarm station server 770 may receive the alerting data and route the alerting data to the terminal 772 for processing by an operator associated with the terminal 772. The terminal 772 may render a display to the operator that includes information associated with the alerting event (e.g., the lock sensor data, the motion sensor data, the contact sensor data, etc.) and the operator may handle the alerting event based on the displayed information.

In some implementations, the terminals 772 and 774 may be mobile devices or devices designed for a specific function. Although FIG. 6 illustrates two terminals for brevity, actual implementations may include more (and, perhaps, many more) terminals.

The one or more user devices 740 and 750 are devices that host and display user interfaces. For instance, the user device 740 is a mobile device that hosts one or more native applications (e.g., the smart home application 742). The user device 740 may be a cellular phone or a non-cellular locally networked device with a display. The user device 740 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 740 may perform functions unrelated to the monitoring system, such as placing personal telephone calls, playing music, playing video, displaying pictures, browsing the Internet, maintaining an electronic calendar, etc.

The user device 740 includes a smart home application 742. The smart home application 742 refers to a software/firmware program running on the corresponding mobile device that enables the user interface and features described throughout. The user device 740 may load or install the smart home application 742 based on data received over a network or data received from local media. The smart home application 742 runs on mobile devices platforms, such as iPhone, iPod touch, Blackberry, Google Android, Windows Mobile, etc. The smart home application 742 enables the user device 740 to receive and process image and sensor data from the monitoring system.

The user device 750 may be a general-purpose computer (e.g., a desktop personal computer, a workstation, or a laptop computer) that is configured to communicate with the monitoring application server 760 and/or the control unit 710 over the network 705. The user device 750 may be configured to display a smart home user interface 752 that is generated by the user device 750 or generated by the monitoring application server 760. For example, the user device 750 may be configured to display a user interface (e.g., a web page) provided by the monitoring application server 760 that enables a user to perceive images captured by the camera 730 and/or reports related to the monitoring system. Although FIG. 6 illustrates two user devices for brevity, actual implementations may include more (and, perhaps, many more) or fewer user devices.

In some implementations, the one or more user devices 740 and 750 communicate with and receive monitoring system data from the control unit 710 using the communication link 738. For instance, the one or more user devices 740 and 750 may communicate with the control unit 710 using various local wireless protocols such as Wi-Fi, Bluetooth, Zwave, Zigbee, HomePlug (ethernet over powerline), or wired protocols such as Ethernet and USB, to connect the one or more user devices 740 and 750 to local security and automation equipment. The one or more user devices 740 and 750 may connect locally to the monitoring system and its sensors and other devices. The local connection may improve the speed of status and control communications because communicating through the network 705 with a remote server (e.g., the monitoring application server 760) may be significantly slower.

Although the one or more user devices 740 and 750 are shown as communicating with the control unit 710, the one or more user devices 740 and 750 may communicate directly with the sensors and other devices controlled by the control unit 710. In some implementations, the one or more user devices 740 and 750 replace the control unit 710 and perform the functions of the control unit 710 for local monitoring and long range/offsite communication.

In other implementations, the one or more user devices 740 and 750 receive monitoring system data captured by the control unit 710 through the network 705. The one or more user devices 740, 750 may receive the data from the control unit 710 through the network 705 or the monitoring application server 760 may relay data received from the control unit 710 to the one or more user devices 740 and 750 through the network 705. In this regard, the monitoring application server 760 may facilitate communication between the one or more user devices 740 and 750 and the monitoring system.

In some implementations, the one or more user devices 740 and 750 may be configured to switch whether the one or more user devices 740 and 750 communicate with the control unit 710 directly (e.g., through link 738) or through the monitoring application server 760 (e.g., through network 705) based on a location of the one or more user devices 740 and 750. For instance, when the one or more user devices 740 and 750 are located close to the control unit 710 and in range to communicate directly with the control unit 710, the one or more user devices 740 and 750 use direct communication. When the one or more user devices 740 and 750 are located far from the control unit 710 and not in range to communicate directly with the control unit 710, the one or more user devices 740 and 750 use communication through the monitoring application server 760.

Although the one or more user devices 740 and 750 are shown as being connected to the network 705, in some implementations, the one or more user devices 740 and 750 are not connected to the network 705. In these implementations, the one or more user devices 740 and 750 communicate directly with one or more of the monitoring system components and no network (e.g., Internet) connection or reliance on remote servers is needed.

In some implementations, the one or more user devices 740 and 750 are used in conjunction with only local sensors and/or local devices in a house. In these implementations, the system 700 only includes the one or more user devices 740 and 750, the sensors 720, the module 722, the camera 730, and the robotic devices. The one or more user devices 740 and 750 receive data directly from the sensors 720, the module 722, the camera 730, and the robotic devices and sends data directly to the sensors 720, the module 722, the camera 730, and the robotic devices. The one or more user devices 740, 750 provide the appropriate interfaces/processing to provide visual surveillance and reporting.

In other implementations, the system 700 further includes network 705 and the sensors 720, the module 722, the camera 730, the thermostat 734, and the robotic devices are configured to communicate sensor and image data to the one or more user devices 740 and 750 over network 705 (e.g., the Internet, cellular network, etc.). In yet another implementation, the sensors 720, the module 722, the camera 730, the thermostat 734, and the robotic devices (or a component, such as a bridge/router) are intelligent enough to change the communication pathway from a direct local pathway when the one or more user devices 740 and 750 are in close physical proximity to the sensors 720, the module 722, the camera 730, the thermostat 734, and the robotic devices to a pathway over network 705 when the one or more user devices 740 and 750 are farther from the sensors 720, the module 722, the camera 730, the thermostat 734, and the robotic devices. In some examples, the system leverages GPS information from the one or more user devices 740 and 750 to determine whether the one or more user devices 740 and 750 are close enough to the sensors 720, the module 722, the camera 730, the thermostat 734, and the robotic devices to use the direct local pathway or whether the one or more user devices 740 and 750 are far enough from the sensors 720, the module 722, the camera 730, the thermostat 734, and the robotic devices that the pathway over network 705 is required. In other examples, the system leverages status communications (e.g., pinging) between the one or more user devices 740 and 750 and the sensors 720, the module 722, the camera 730, the thermostat 734, and the robotic devices to determine whether communication using the direct local pathway is possible. If communication using the direct local pathway is possible, the one or more user devices 740 and 750 communicate with the sensors 720, the module 722, the camera 730, the thermostat 734, and the robotic devices using the direct local pathway. If communication using the direct local pathway is not possible, the one or more user devices 740 and 750 communicate with the sensors 720, the module 722, the camera 730, the thermostat 734, and the robotic devices using the pathway over network 705.

In some implementations, the system 700 provides end users with access to images captured by the camera 730 to aid in decision making. The system 700 may transmit the images captured by the camera 730 over a wireless WAN network to the user devices 740 and 750. Because transmission over a wireless WAN network may be relatively expensive, the system 700 uses several techniques to reduce costs while providing access to significant levels of useful visual information.

In some implementations, a state of the monitoring system and other events sensed by the monitoring system may be used to enable/disable video/image recording devices (e.g., the camera 730). In these implementations, the camera 730 may be set to capture images on a periodic basis when the alarm system is armed in an "Away" state, but set not to capture images when the alarm system is armed in a "Stay" state or disarmed. In addition, the camera 730 may be triggered to begin capturing images when the alarm system detects an event, such as an alarm event, a door-opening event for a door that leads to an area within a field of view of the camera 730, or motion in the area within the field of view of the camera 730. In other implementations, the camera 730 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A monitoring system that is configured to monitor a property, the monitoring system comprising:
   a sensor that is located at the property and that is configured to generate sensor data;
   a monitoring application server that is configured to:
      receive the sensor data;
      receive geographic data for a user of the monitoring system;
      determine past user behavior data for the user of the monitoring system;
      determine current user behavior data for the user of the monitoring system;
      apply the sensor data, the geographic data, the past user behavior data, and the current user behavior data to a model that determines an estimated alarm status of the monitoring system; and based on the estimated alarm status of the monitoring system, control the monitoring system.

2. The system of claim 1, wherein the monitoring application server is configured to:
   based on applying the sensor data, the geographic data, the past user behavior data, and the current user behavior data to the model that determines the estimated alarm status of the monitoring system, determine a risk score of the monitoring system, the risk score indicating a likelihood that the monitoring system is at risk for an alarm;
   compare the risk score to an active alarm threshold; and
   based on comparing the risk score to the active alarm threshold, determine that the alarm score satisfies the active alarm threshold;
   based on determining that the risk score satisfies the active alarm threshold, determine that the estimated alarm status of the monitoring system is an estimated active alarm.

3. The system of claim 2, wherein the monitoring application server is configured to:
   based on applying the sensor data, the geographic data, the past user behavior data, and the current user behavior data to the model, identify one or more resident actions to reduce the risk score; and
   provide, for output, data identifying the one or more actions.

4. The system of claim 2, wherein the monitoring application server is configured to:
   based on applying the sensor data, the geographic data, the past user behavior data, and the current user behavior data to the model, identify one or more installer actions to reduce the risk score; and
   provide, for output, data identifying the one or more actions.

5. The system of claim 1, wherein the monitoring application server is configured to:
   based on applying the sensor data, the geographic data, the past user behavior data, and the current user behavior data to the model that determines the estimated alarm status of the monitoring system, determine a risk score of the monitoring system, the risk score indicating a likelihood that the monitoring system is at risk for an alarm;
   compare the risk score to an inactive alarm threshold;
   based on comparing the risk score to the inactive alarm threshold, determine that the risk score satisfies the inactive alarm threshold; and
   based on determining that the risk score satisfies the inactive alarm threshold, determine that the estimated alarm status of the monitoring system is an estimated inactive alarm.

6. The system of claim 1, wherein the monitoring application server is configured to:
   receive data indicating an actual alarm status of the monitoring system;
   determine that the estimated alarm status of the monitoring system is different from the actual alarm status of the monitoring system; and
   control the monitoring system by overriding the actual alarm status of the monitoring system based on determining that the estimated alarm status of the monitoring system is different from the actual alarm status of the monitoring system.

7. The system of claim 6, wherein the monitoring application server is configured to:
   receive, from the user, data verifying the overridden alarm status of the monitoring system; and
   based on receiving, from the user, data verifying the overridden alarm status of the monitoring system, update the model that determines the estimated alarm status of the monitoring system.

8. The system of claim 1, wherein the monitoring application server is configured to:
   receive additional sensor data and data indicating an additional actual alarm status of the monitoring system;
   apply the additional sensor data to the model to determine an additional estimated alarm status of the monitoring system;
   determine that the additional estimated alarm status of the monitoring system is the same as the additional actual alarm status of the monitoring system; and
   based on determining that the additional estimated alarm status of the monitoring system is the same as the additional actual alarm status of the monitoring system, maintain the additional actual alarm status of the monitoring system.

9. The system of claim 1, wherein the monitoring application server is configured to:
   train, using machine learning, the model that determines the estimated alarm status of the monitoring system.

10. The system of claim 1, wherein the monitoring application server is configured to:
    receive account status data for the user of the monitoring system; and
    apply the sensor data, the geographic data, the past user behavior data, and the current user behavior data to the model that determines the estimated alarm status of the monitoring system by applying the sensor data, the geographic data, the past user behavior data, the current user behavior data, and the account status data to the model that determines the estimated alarm status of the monitoring system.

11. A method comprising:
    receiving, by a monitoring application server, sensor data captured by a sensor that is located at a property monitored by a monitoring system;
    receiving, by the monitoring application server, geographic data for a user of the monitoring system;
    determining, by the monitoring application server, past user behavior data for the user of the monitoring system;
    determining, by the monitoring application server, current user behavior data for the user of the monitoring system;
    applying, by the monitoring application server, the sensor data, the geographic data, the past user behavior data, and the current user behavior data to a model that determines an estimated alarm status of the monitoring system; and
    based on the estimated alarm status of the monitoring system, controlling, by the monitoring application server, the monitoring system.

12. The method of claim 11, further comprising:
    based on applying the sensor data, the geographic data, the past user behavior data, and the current user behavior data to the model that determines the estimated alarm status of the monitoring system, determining a risk score of the monitoring system, the risk score indicating a likelihood that the monitoring system is at risk for an alarm;
    comparing the risk score to an active alarm threshold;

based on comparing the risk score to the active alarm threshold, determining that the alarm score satisfies the active alarm threshold; and based on determining that the risk score satisfies the active alarm threshold, determining that the estimated alarm status of the monitoring system is an estimated active alarm.

13. The method of claim 12, further comprising:

based on applying the sensor data, the geographic data, the past user behavior data, and the current user behavior data to the model, identifying one or more resident actions to reduce the risk score; and providing, for output, data identifying the one or more actions.

14. The method of claim 12, further comprising:

based on applying the sensor data, the geographic data, the past user behavior data, and the current user behavior data to the model, identifying one or more installer actions to reduce the risk score; and providing, for output, data identifying the one or more actions.

15. The method of claim 11, further comprising:

based on applying the sensor data, the geographic data, the past user behavior data, and the current user behavior data to the model that determines the estimated alarm status of the monitoring system, determining a risk score of the monitoring system, the risk score indicating a likelihood that the monitoring system is at risk for an alarm;

comparing the risk score to an inactive alarm threshold;

based on comparing the risk score to the inactive alarm threshold, determining that the risk score satisfies the inactive alarm threshold; and based on determining that the risk score satisfies the inactive alarm threshold, determining that the estimated alarm status of the monitoring system is an estimated inactive alarm.

16. The method of claim 11, further comprising:

receiving data indicating an actual alarm status of the monitoring system; and determining that the estimated alarm status of the monitoring system is different from the actual alarm status of the monitoring system, wherein controlling the monitoring system comprises overriding the actual alarm status of the monitoring system based on determining that the estimated alarm status of the monitoring system is different from the actual alarm status of the monitoring system.

17. The method of claim 16, further comprising:

receiving, from the user, data verifying the overridden alarm status of the monitoring system; and based on receiving, from the user, data verifying the overridden alarm status of the monitoring system, updating the model that determines the estimated alarm status of the monitoring system.

18. The method of claim 11, further comprising:

receiving additional sensor data and data indicating an additional actual alarm status of the monitoring system;

applying the additional sensor data to the model to determine an additional estimated alarm status of the monitoring system;

determining that the additional estimated alarm status of the monitoring system is the same as the additional actual alarm status of the monitoring system; and based on determining that the additional estimated alarm status of the monitoring system is the same as the additional actual alarm status of the monitoring system, maintaining the additional actual alarm status of the monitoring system.

19. The method of claim 11, further comprising training, using machine learning, the model that determines the estimated alarm status of the monitoring system.

20. The method of claim 11, further comprising receiving account status data for the user of the monitoring system;

wherein applying the sensor data, the geographic data, the past user behavior data, and the current user behavior data to the model that determines the estimated alarm status of the monitoring system comprises applying the sensor data, the geographic data, the past user behavior data, the current user behavior data, and the account status data to the model that determines the estimated alarm status of the monitoring system.

* * * * *